United States Patent [19]

Rimondi et al.

[11] Patent Number: 4,909,356

[45] Date of Patent: Mar. 20, 1990

[54] FULLY SELF-SERVICE CHECK-OUT COUNTER INCORPORATING AN INTEGRAL APPARATUS FOR ON DEMAND MANUFACTURING OF CUSTOM-SIZED BAGS CONFORMING TO THE VOLUME OF ARTICLES RECEIVED THEREIN

[75] Inventors: Renato Rimondi, Bazzano; Angelo Cappi, Vignola, both of Italy

[73] Assignee: A.W.A.X. Progettazione e Ricerca S.r.l., Vignola, Italy

[21] Appl. No.: 304,797

[22] Filed: Jan. 31, 1989

[30] Foreign Application Priority Data

Feb. 4, 1988 [IT] Italy ................ 19327 A/88

[51] Int. Cl.⁴ ............................................. A63F 9/02
[52] U.S. Cl. .................................... 186/61; 53/66;
53/134; 53/390; 53/502; 53/504; 53/558;
53/562; 177/50; 186/66; 235/375; 235/383;
493/8; 493/11; 493/28; 493/194; 493/196;
493/926
[58] Field of Search ................ 186/56, 59, 61, 66;
235/375, 383, 385; 177/50; 53/390, 391, 66,
502, 504, 134, 550, 558, 562, 568, 570; 493/926,
194, 196, 8, 11, 28

[56] References Cited

U.S. PATENT DOCUMENTS

| | | | |
|---|---|---|---|
| 2,919,851 | 1/1960 | Otis | 186/59 X |
| 3,321,888 | 5/1967 | Kirkhof | 53/502 X |
| 3,564,814 | 2/1971 | Graveley | 186/66 X |
| 3,626,662 | 12/1971 | Graveley | 186/66 X |
| 3,628,632 | 12/1971 | Lambert | 186/66 |
| 3,662,514 | 5/1972 | Goss | 53/390 X |
| 3,673,765 | 7/1972 | Dohmeier et al. | 53/570 |
| 3,681,571 | 8/1972 | Strohschneider | 235/383 |
| 3,715,862 | 2/1973 | Schohl | 186/66 X |
| 3,740,922 | 6/1973 | Liou | 53/390 X |
| 3,855,907 | 12/1974 | Johnson et al. | 53/570 X |
| 3,860,091 | 1/1975 | Chesnut | 186/66 |
| 3,903,672 | 9/1975 | Goglio | 53/558 X |
| 4,020,618 | 5/1977 | Benzon-Petersen et al. | 186/66 X |
| 4,107,900 | 8/1978 | Izumi | 53/558 X |
| 4,177,621 | 12/1979 | Powell, Jr. | 53/502 X |
| 4,274,245 | 6/1981 | Lagen et al. | 53/390 X |
| 4,306,633 | 12/1981 | Lagen et al. | 186/66 |
| 4,543,766 | 10/1985 | Boshinski | 53/502 X |
| 4,583,345 | 4/1986 | Hirosaki et al. | 53/66 X |
| 4,597,240 | 7/1986 | Scully | 53/66 |
| 4,792,018 | 12/1988 | Humble et al. | 186/59 X |

FOREIGN PATENT DOCUMENTS 0019023 11/1980 European Pat. Off. ........... 53/390

Primary Examiner—Kevin P. Shaver
Attorney, Agent, or Firm—Cohen, Pontani & Lieberman

[57] ABSTRACT

A self-service check-out counter for cashier-unattended use and operation includes an laser scanner for automated reading of product identification codes borne by articles to be purchased, a keyboard for manual entry of article-identifying information, a variety of indicators and signalling devices for instructing actions by the customer, devices for preventing pilferage, fraud and inadvertent errors and an integral bag forming apparatus for manufacturing custom-formed bags on-site at the counter and on demand and, preferably, custom-sized to conform to the volume of articles to be packed in the bags. A customer individually scans articles to be purchased and the scanned data is verified through comparison with stored product identifying information. Following verification of each article, customer placement of the article into the bag forming apparatus in enabled and a bag preferably conforming to the volume of articles purchased in manufactured within the check-out counter. When filled, the bag is automatically sealed and discharged from the check-out counter for subsequent removal by the customer. Customers completing the scanning and packing of purchased articles proceed to a central cashier to pay for their purchases.

32 Claims, 30 Drawing Sheets

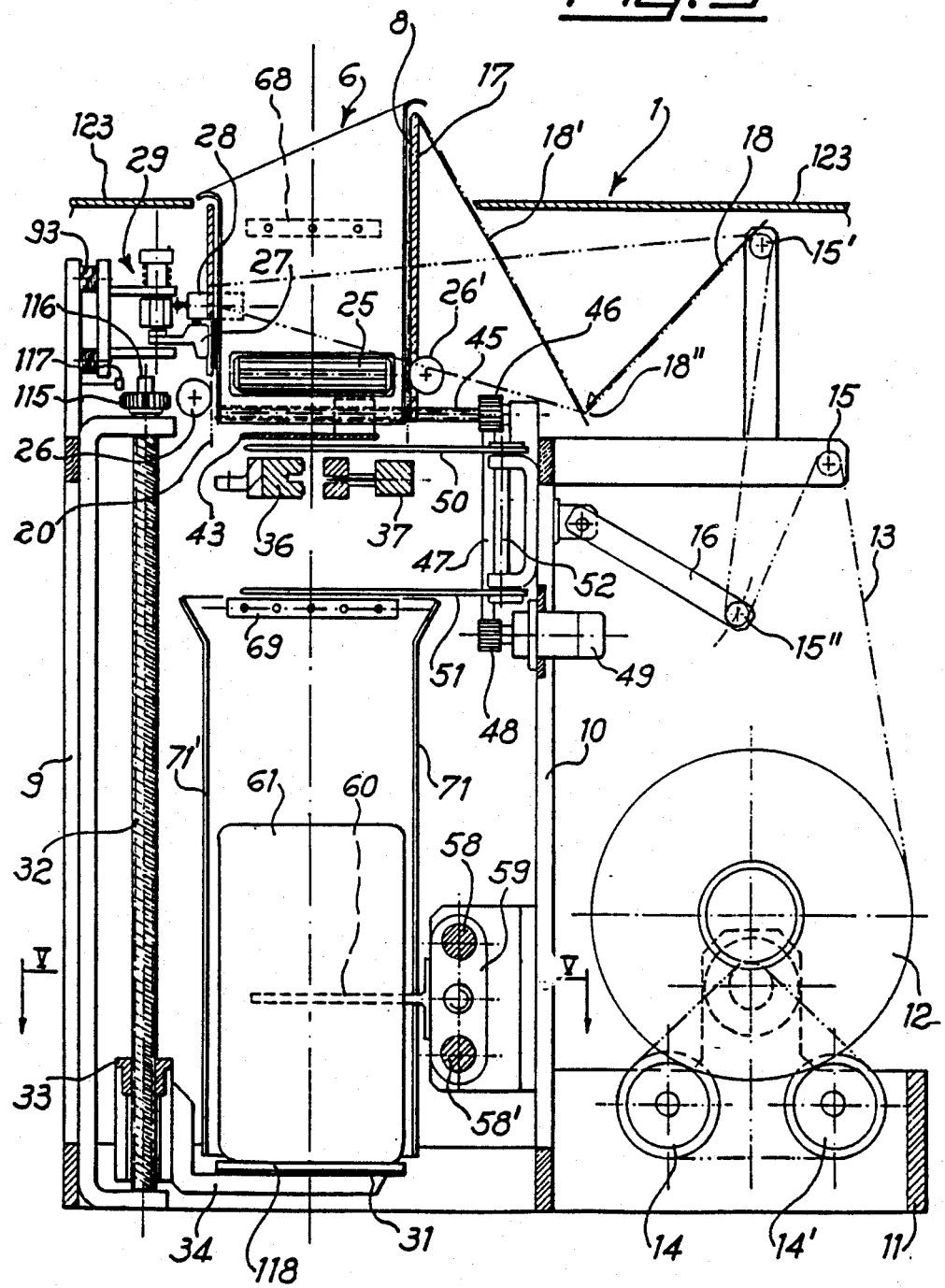

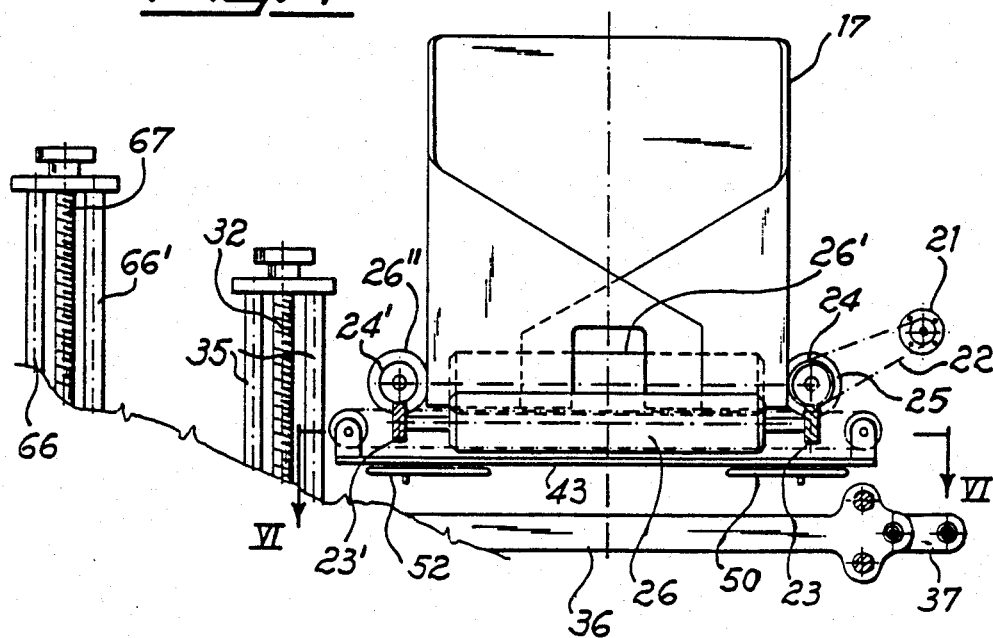
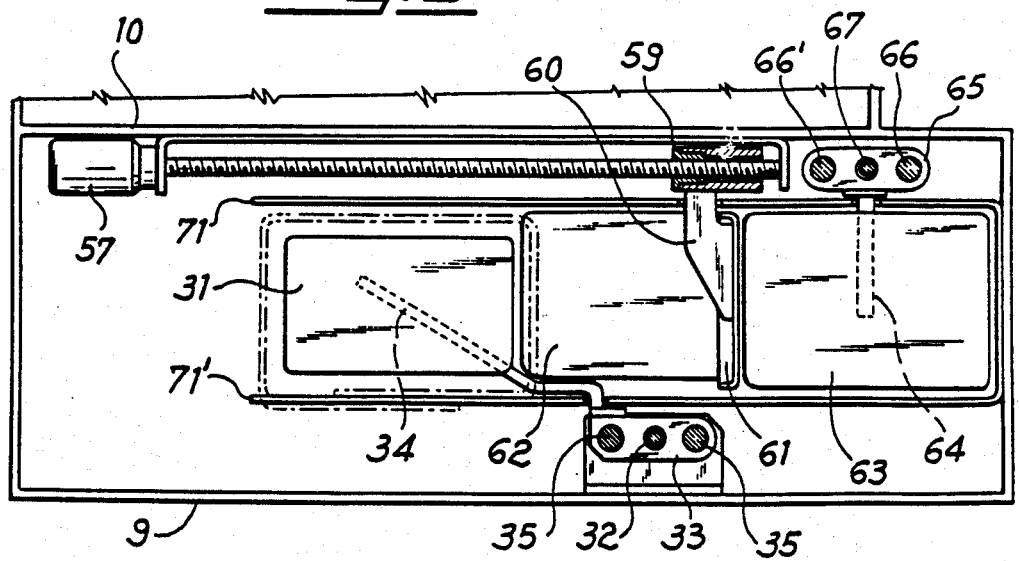

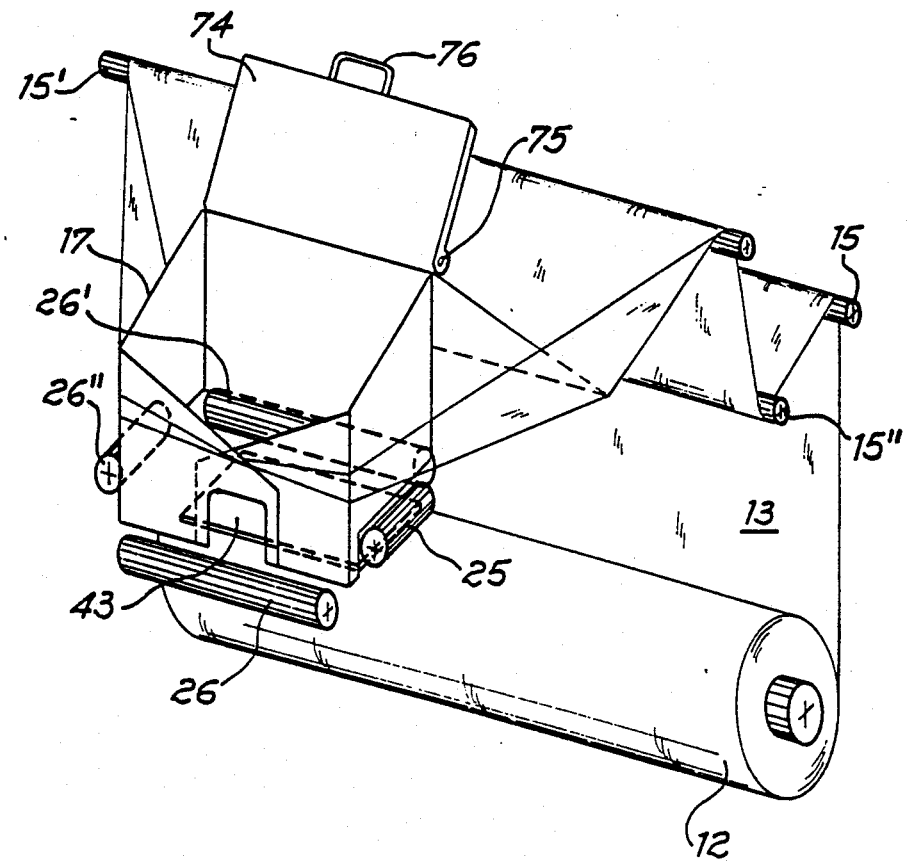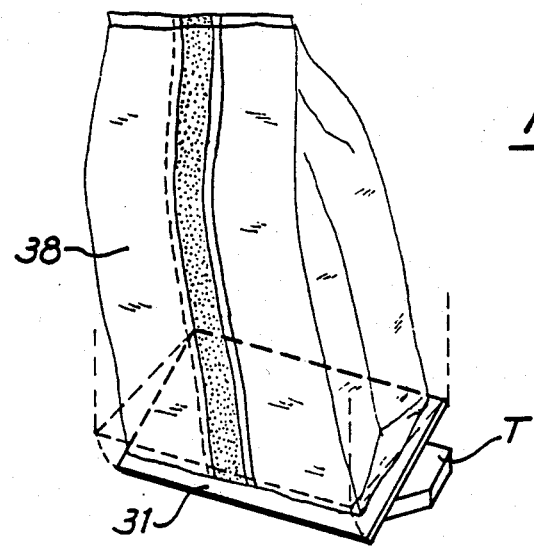
Fig. 21

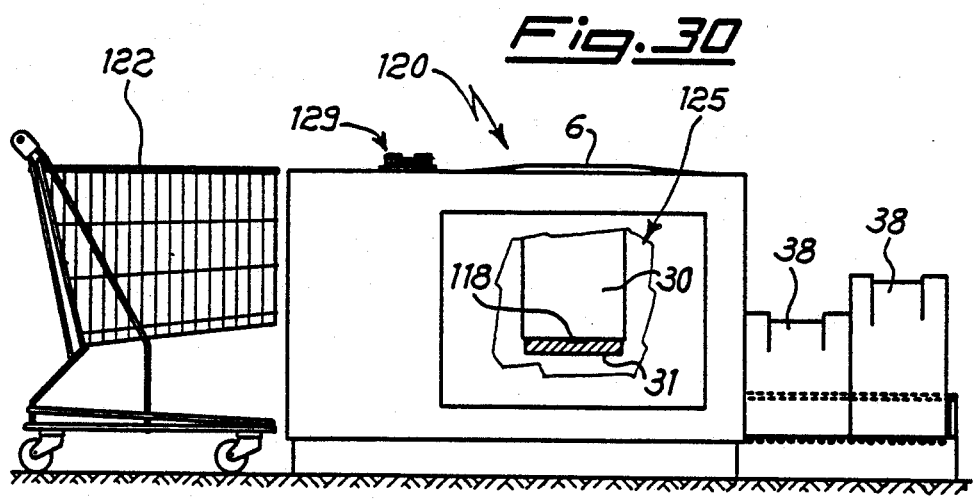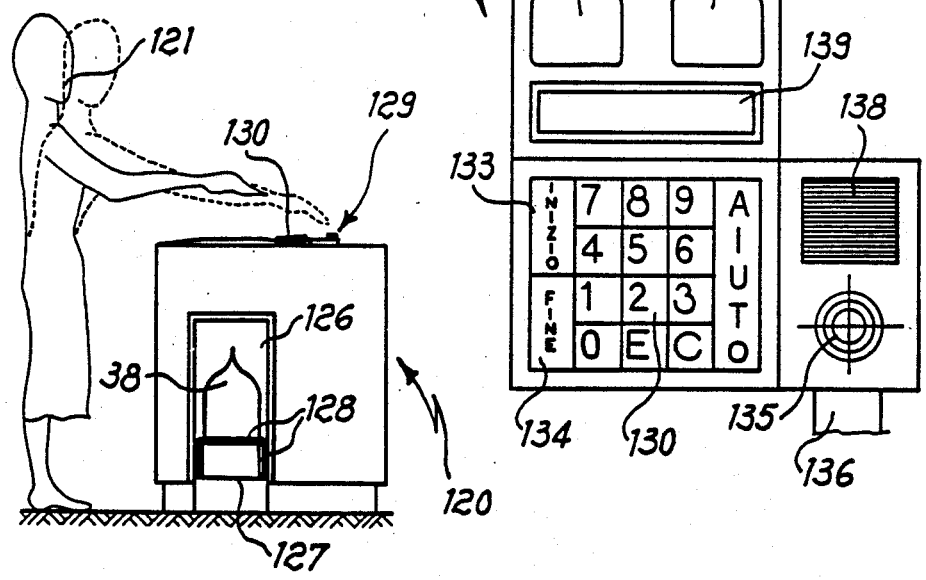

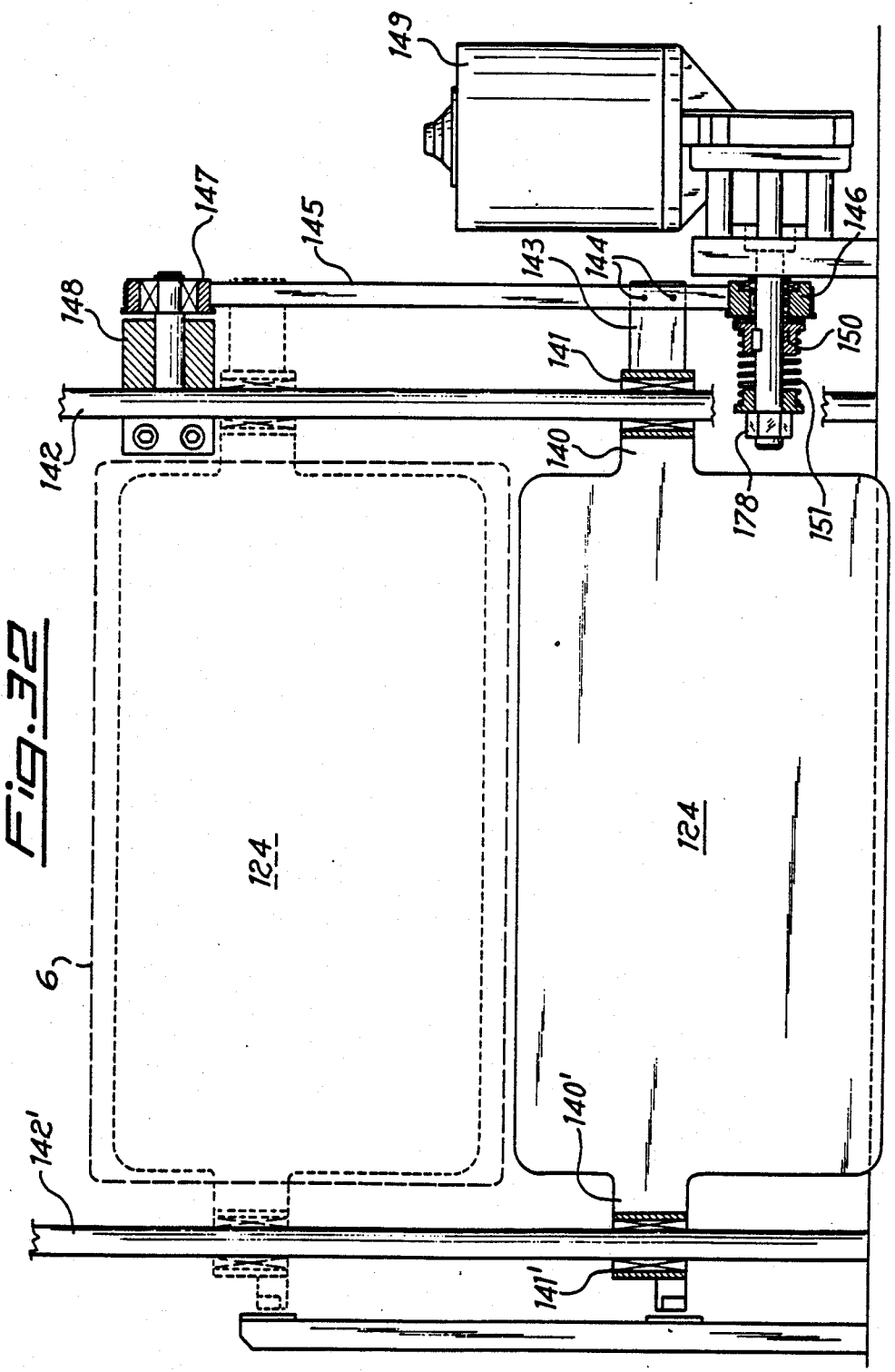

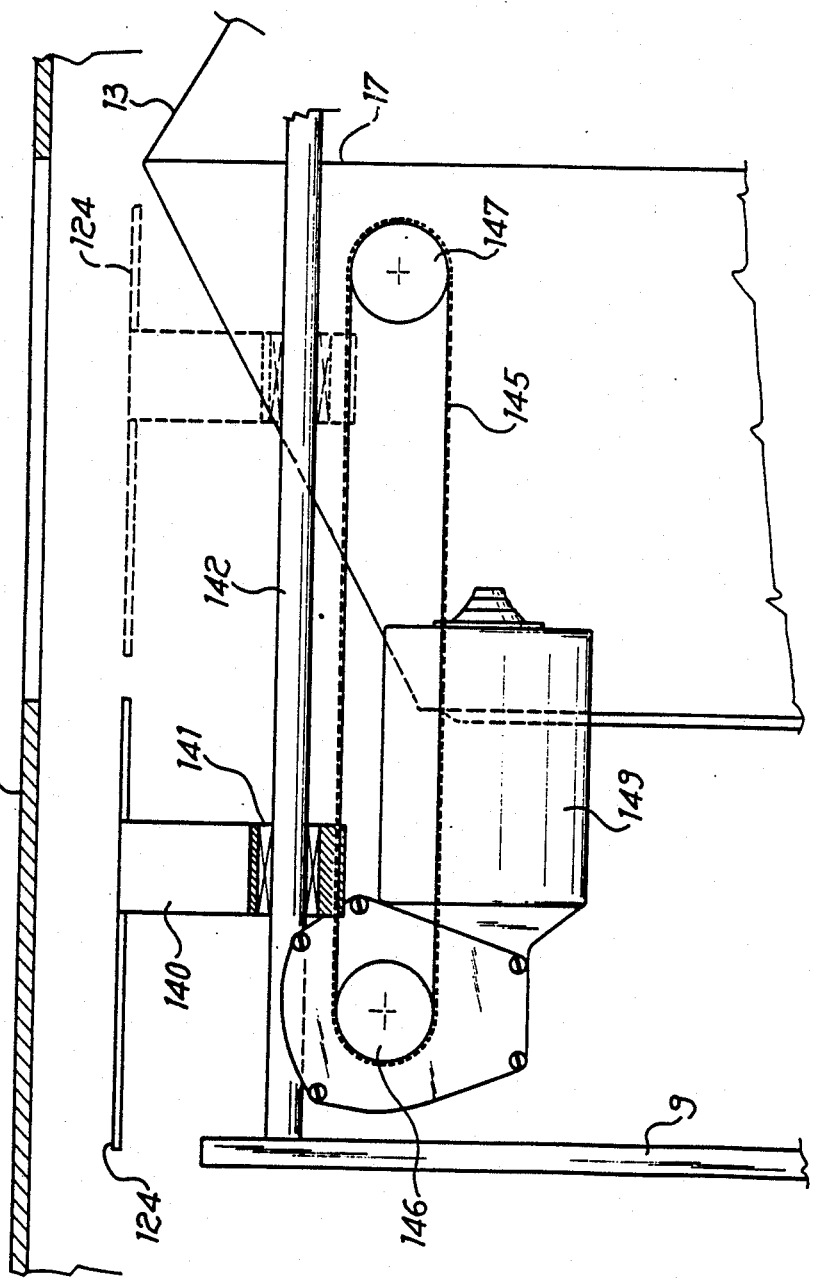

FULLY SELF-SERVICE CHECK-OUT COUNTER INCORPORATING AN INTEGRAL APPARATUS FOR ON DEMAND MANUFACTURING OF CUSTOM-SIZED BAGS CONFORMING TO THE VOLUME OF ARTICLES RECEIVED THEREIN

BACKGROUND OF THE INVENTION

1. Field of the Invention

The present invention relates to check-out counters used, for example, in supermarkets and other sales establishments, and which are adapted for fully self-service and cashier-unattended use by a customer. It is more particularly directed to self-service check-out counters which integrally incorporate apparatus for on-side and on-demand manufacturing of flaccid or flexible bags, preferably custom-sized to conform to the volume of articles packed therein, for advantageously increasing the efficiency with which customers proceed through the check-out procedure and significantly decreasing merchant costs.

2. Description of the Prior Art

Current practice at supermarkets is to have a cashier-operator at each check-out counter register, either by automated scanner or direct manual keyboard entry, or both, the prices of the various articles being purchased by a customer. The cashier, an assistant, or the customer then places the articles or goods in a bag which has generally been preformed most commonly either of plastic material or of paper. Similar practices and attendant problems exist at department stores and other retail establishments.

The design and operation of current, conventional check-out counters presents what is probably the single most significant impediment to the efficient movement of customers through and out of sales establishments such, for example, as supermarkets. The cashier at each check-out counter individually picks up and examines each item, enters item identification or pricing information into the register, and returns the item to the counter. When entry of all goods being purchased has been completed, the items are again picked up from the counter and packed in preformed bags usually by the cashier, sometimes by or with the assistance of a separate bagging employee and/or the customer. Typically, the cashier is unable to begin to process the next customer's intended purchases until packing of the preceding customer's goods is complete and the filled or partly filled bags have been removed from the check-out counter. Although the recent introduction and rapidly spreading use of laser-based universal product code scanning devices has somewhat increased the rate at which customers are able to advance through check-out counters, the cashier-operator must still pick up or grip each item, properly orient the item and slide it past the scanning window, and then replace it on the counter for subsequent packing in the preformed bags which must themselves be individually unfolded and set up on the counter for receiving the purchased articles. These repetitive operations are both awkward and time consuming, resulting in highly inefficient processing of customers who have already completed their selection of items to be purchased and want only to pay for their purchases and leave the store. They are in addition extremely labor intensive and, therefore, expensive for the merchant to implement in that a store must staff each and every check-out counter with an individual cashier-operator and, in some cases, with an additional bagging employee as well.

Moreover, in order to properly accommodate the great majority of customer purchase, the preformed bags are typically sized with sufficiently large dimensions for holding a substantial number of articles. In actual use, however, the volume of articles packed in the bags varies greatly from bag to bag resulting in customer difficulty and inconvenience in manipulating a combination of filled and partially filled open-topped bags, in substantial waste of materials and in further increased costs to the merchant.

The prior art discloses a variety of efforts to increase the efficiency of check-out operations. For example, U.S. Pat. No. 4,676,343 to Humble et al discloses a check-out counter arranged for direct operation by the customer and thus intended to obviate the need for the merchant to supply separate cashiers for each counter or check-out station. The customer individually passes each item to be purchased over a laser scanner located at one end of the counter, following which the item is returned to the counter and carried, by a moving conveyor belt, through a security tunnel and then to the opposite end of the counter for subsequent bagging. While passing through the security tunnel the item is scanned a second time to verify the identity of the item being purchased and thereby prevent inadvertent or fraudulent customer conduct during the check-out procedure. When scanning and subsequent packing in preformed bags of all of the articles being purchased has been completed, the customer proceeds to a central cashier where the goods ar paid for and the check-out transaction ends.

Although the arrangement of the Humble patent should reduce the merchant's costs by minimizing the number of cashier-employees required, it has no effect on the various other sources of check-out inefficiency previously noted. Indeed, in addition to having to handle each item at least twice—once to pass the article across the scanner and again to pack the item in a bag—the conveyor-carried passage of each item through the security tunnel and the rescanning of the product as a preventative to pilferage and honest mistake is likely to increase, rather than decrease, the time that each customer spends in the entire check-out procedure. And the use of preformed bags remains both an inconvenience for customers and a source of added and difficult-to-control costs to the merchant.

OBJECTS OF THE INVENTION

It is accordingly the desideratum of the invention to provide a check-out counter apparatus and method in which customers may proceed through the check-out procedure in a substantially expedited manner.

It is a particular object of the invention to provide such a check-out counter apparatus and method which requires only minimal handling of articles being purchased.

It is another object of the invention to provide such a check-out counter apparatus and method which is operated entirely by the customer and does not therefore require the presence or assistance of a cashier or other store employee.

It is a further object of the invention to provide such a check-out counter apparatus and method in which articles being purchased are packed in bags custom formed on-site at the counter and on-demand as required for receiving the purchased articles.

Yet another object of the invention is to provide such a check-out counter apparatus and method in which bags manufactured on-site and on-demand at the counter are custom-sized to conform to the volume of articles purchased and to be received in the bags.

A further object of the invention is to provide such a check-out counter apparatus and method which incorporates sufficient safeguards to prevent deliberate fraud and attempts at pilferage as well as inadvertent mistakes by customers using the apparatus and practicing the method of the invention.

BRIEF DESCRIPTION OF THE DRAWINGS

In the drawings, wherein like reference characters denote similar elements throughout the several views:

FIG. 3 is a partially sectioned side elevational view taken along the lines III—III of FIG. 1;

FIG. 4 is a partially sectioned front view of the apparatus looking from the left in FIG. 3;

FIG. 5 is a sectional view taken along the lines V—V of FIG. 3;

FIGS. 16 to 21 are partial schematic perspective views of the apparatus during the various phases of the process of filling and forming a custom-sized bag in accordance with another embodiment of the invention;

FIG. 29 is an end view, in elevation, of the self-service check-out counter of FIG. 28;

FIG. 30 is a side view, in elevation and partly broken away, of the self-service check-out counter of FIG. 28;

FIG. 31 is an enlarged plan view of the information entry and display panel of the self-service check-out counter of FIG. 28;

FIG. 32 is an enlarged plan view of a shutter reciprocating apparatus for use in the self-service check-out counter of FIG. 28;

FIG. 33 is a view, partly broken away, of the shutter reciprocating apparatus of FIG. 32 taken along the lines 33—33 in FIG. 28;

DETAILED DESCRIPTION OF THE PREFERRED EMBODIMENTS

Figure 1:
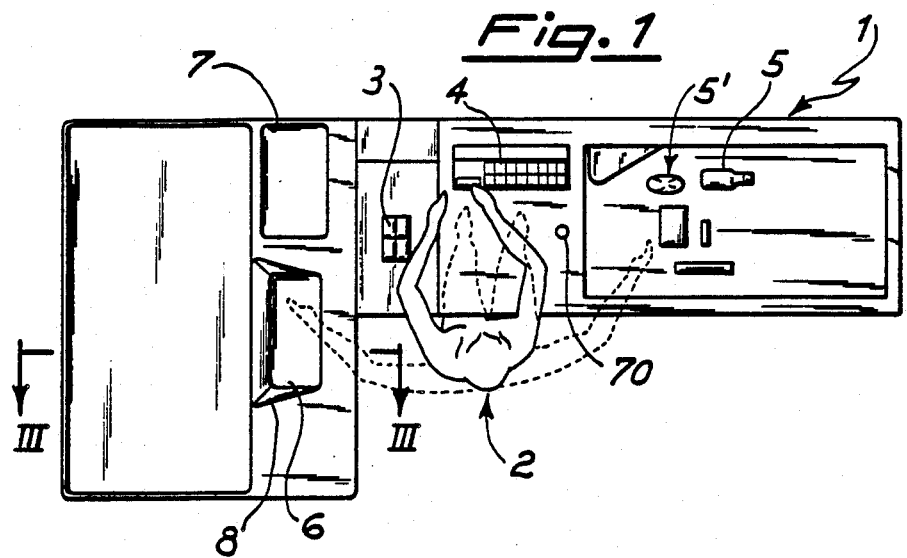
FIG. 1 is a plan view of a supermarket check-out counter in accordance with one illustrative form of the present invention.
Figure 2:
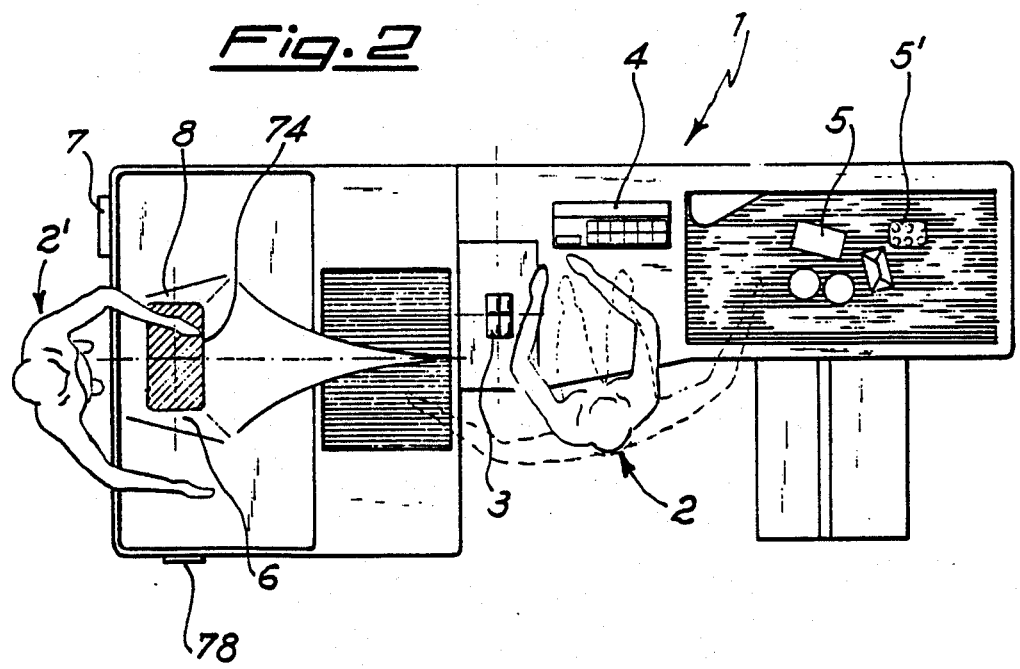
FIG. 2 is a plan view of a supermarket check-out counter in accordance with another illustrative form of the invention.

Two alternate embodiments of a supermarket check-out counter 1 constructed in accordance with the present invention are respectively illustrated in FIGS. 1 and 2. In each, a supermarket counter 1 situated before a workplace occupied by a cashier 2 is provided with an automated scanner 3 and a keyboard 4 or, alternatively o additionally, with a manually operable cash register. There is usually and preferably a conveyor belt onto which the customer places articles or items 5, 5' which, after cashier 2 has registered their prices by means of the scanner or through manual entry at the keyboard, are advanced by the conveyor belt for insertion by cashier 2 or by the customer 2' into an opening 6 defined in the top surface of counter 1. Other arrangements, of course, including manual means, may be employed to advance the items along counter 1. In any event, it is intended in the embodiment of FIG. 1 that the ba be packed by placing the purchased goods or articles 5, 5' into and through counter opening 6. The check-out counter of FIG. 2 is especially configured to facilitate the packing of purchased articles by the customer 2' as will hereinafter be described, although the customer can assist packing with either arrangement.

Referring now to FIGS. 3 and 4, a first embodiment of the apparatus for forming the bag, which is incorporated within the confines of check-out counter 1, comprises a roll 12 of continuous flat film sheet material 13 placed on a pair of support and drive rollers 14, 14' which, when driven by a drive motor (not shown), rotate to turn roll 12 and thus cause material or film 13 to unwind from the roll. Sheet material 13 may be plastic, preferably thermoplastic, or other suitable flat continuous sealable material, such as plasticized paper. Examples of such materials are polyethylene, polypropylene, polyvinylchloride, and paper coated with or laminated to such plastics.

Film 13 is drawn from roll 12 and is guided around jockey rollers 15, 15' and intermediate tensioning roller 15", the latter of which is movably mounted on a constant tension frame 16 as is well known in the art. After passing over jockey roller 15', film 13 passes along a pair of guiding planes or surfaces 18, 18' disposed in a generally V-shaped orientation, passing under plane or surface 18, through gap 18" between the planes, over plane 18' and into the interior of a generally quadrangular hollow former 17 in such a way that, as will hereinafter become clear, the longitudinal film edges 19, 19' overlap to form a continuous tubular wrapper 20. More particularly, planes 18, 18', which are disposed with an opening or gap defined between their respective lower edges, each progressively tapers in its transverse dimension or width in the direction of film movement. Thus, plane 18 gradually narrows from its top-disposed edge adjacent roller 15'—which edge is dimensioned at least as wide as the width of the film—to its lower edge. And plane 18' similarly narrows from its lower edge —which is of substantially the same width as the adjacent lower edge of plane 18—to its uppermost edge which is disposed adjacent former 17 and has substantially the same width as the former. This arrangement facilitates the translation of film 13 from its initially flat condition to a tubular wrapper 20 within former 17. It should nevertheless be recognized that alternate arrangements—such as a suitably dimensioned roller mounted at the approximate location of the gap defined between planes 18, 18'—may be substituted for the V-disposed planes 18, 18' to implement the same function.

Figure 6:
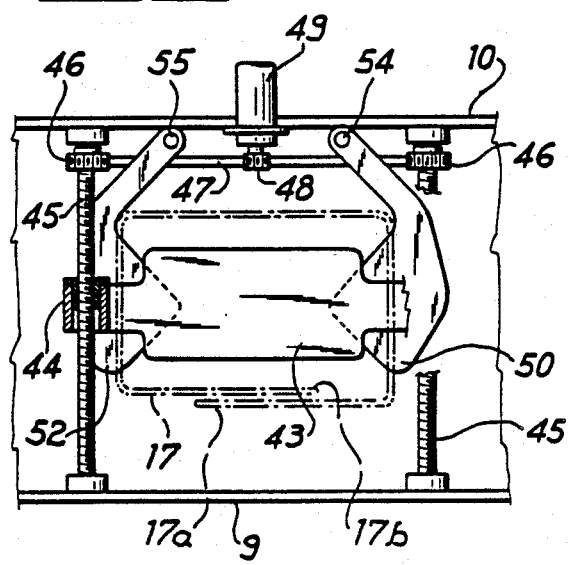
FIG. 6 is a sectional view taken along the lines VI—VI of FIG. 4.

Former 17 is located under and may project partly through the top surface of counter 1 and in register with opening 6 through which goods to be packed are introduced. As perhaps best seen in FIG. 6, the front face of the former 17—i.e. that face most remote from film roll 12 and guide planes 18, 18'—is not continuous but rather is formed by overlapping and spaced apart wall extensions 17a, 17b. Extensions 17a, 17b cooperate with film 13 to form therefrom the continuous tubular wrapper 20 with the film edges 19, 19' in superimposed or overlapping relation (see for instance FIGS. 9 and 19). Thus, from jockey roller 15' the film is guided along the underside of plane 18, through the gap 18" defined between the planes 18, 18', along the upper face of plane 18' and into the interior of former 17. As shown in each of FIGS. 9 to 15, the transverse narrowing of plane 18, 18' and the spaced apart wall extensions 17a, 17b cause the film 13 to enter the former and form the tube 20 immediately adjacent and continuously along the interior walls of the former.

The tubular wrapper 20 is thus formed from the single film sheet material 13 along the interior substantially vertical walls of former 17. It should nevertheless be apparent to those skilled in the art and having knowledge of this disclosure that numerous alternative arrangements for converting the film sheet into a continuous tube may be employed in accordance with the invention. For example, former 17 may be modified to eliminate its entire lower portion below the top edges or lips over which the film 13 is guided into the shape of a tube. On the other hand, formation of the tubular wrapper 20 may instead be carried out about and around the exterior surfaces of mandrel as is known in the art; such an arrangement is, for example, disclosed in U.S. Pat. No. 3,903,672. These and other modifications in the means for converting the continuous film sheet to a tubular wrapper are within the scope and contemplation of the invention. The opening 6 in the top surface of counter 1 is internally provided with a downwardly extending mouthpiece or collar 8 which is inwardly spaced from and within former 17 so that the tubular film wrapper 20 is disposed in the channel defined between the walls of the collar and the former. Collar 8 delineates a chute for the introduction of goods to be packed, and also prevents potentially damaging contact of the introduced goods with film 13 before the tubular wrapper 20 is fully formed and the resulting bag completed.

The continuous flat film material 13 is advanced downwardly along and within former 17 by rotation of a set of rollers 25, 26, 26' and 26" mounted respectively about the lower wall portions of the former and collar. Roller 25 is directly driven by a motor 21 and a chain 22 connecting the roller and the motor shaft. Rollers 26, 26' and 26" are in turn rotated by the turning of roller 25 through helical gears 23, 23' and conical gears 24, 24'. Specifically, roller 25 carries, at its opposite ends, a helical gear 23 which engages roller 26, and a conical gear 24 in engagement with roller 26'. Roller 26 and 26', in turn, carry at their ends opposite roller 25 a helical gear 23' and a conical gear 24', respectively, which operatively engage roller 26" at its opposite ends. Thus, motor driven rotation of roller 25 effects corresponding rotation of rollers 26, 26' and 26". These four rollers, disposed such that rollers 25 and 26", and rollers 26 and 26', are respectively parallel and of like dimensions, project through suitable openings in former 17 and into engagement with tube-formed film 13. The film is thereby interposed and pressed between the rollers and collar 8 and thereby drawn downwardly within former 17 a motor 21 is predeterminately operated in accordance with the invention.

As film 13, in the form of tubular wrapper 20, is downwardly drawn within former 17 its overlapped longitudinal edges 19, 19' are joined by a longitudinal heat sealing or welding device 29 (FIG. 3). Device 29, which will be fully described hereinafter, includes a heated welding head 27 which is movable by operation of an electromagnet 28 to press the overlapped film edges 19, 19' of the longitudinally advancing film tube between head 27 and collar 8. The closed tubular wrapper 20 thereby obtained is subsequently transformed into a bag 30 by a transverse heat seal which forms the bottom of the bag as will soon become clear.

Referring now to FIGS. 3 and 5, the bag forming apparatus further includes a loading platform 31 for supporting the bottom of bag 30 as articles o be packed are introduced by the cashier or customer into the counter opening 6. Loading platform 31 is arranged for vertical movement from a fully raised position immediately below former 17 and collar 8 to a fully lowered position adjacent the bottom of the machine frame, the latter position being shown in FIG. 3. A bracket 34 which is fixed to and supports loading platform 31 is connected to a lead screw 33 engaged with a rotatable threaded bar 32 to which rotative motion is selectively applied by an electric motor (not shown). Thus, depending upon the direction of rotation of threaded bar 32, lead screw 33 is moved along bar 32 to raise o lower platform 31. As will soon become evident, the descent of loading platform 21 may also be halted at any height or level during operation of the apparatus as a function, for example, of the volume or weight of the articles introduced into bag 30

In order to distribute the load on platform 31 and to insure a smooth passage for the platform, a pair of guide bars 35 are provided adjacent threaded bar 32 (FIG. 4). Two unthreaded apertures in lead screw 33 receive the guide bars with a close sliding fit. Of course, other guide means may additionally or alternatively be employed as a matter of design choice.

Figure 7:
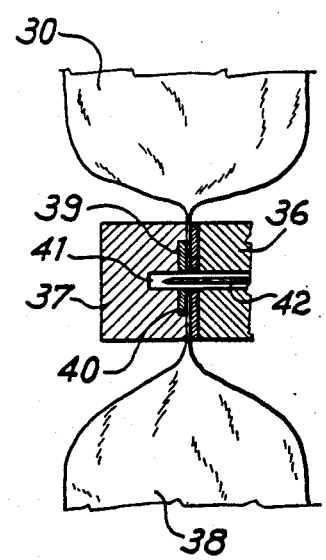
FIGS. 7 and 8 are enlarged sectional views of a sealing and transverse cutting means of the invention shown during cutting and sealing, and after cutting and sealing, respectively.
Figure 8:
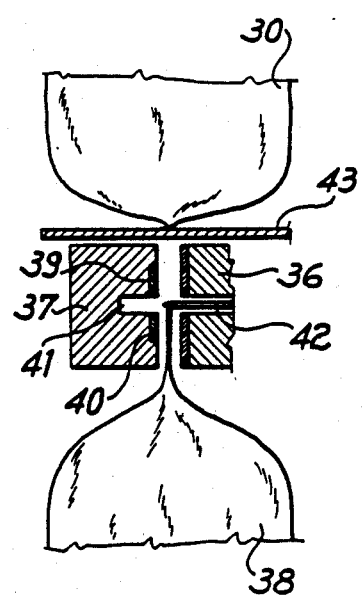

A transverse sealing means for closing a full bag 38 and for concurrently creating the bottom of a bag 30 next being formed is illustrated in FIGS. 7 and 8. The transverse sealing means there shown comprises a pair of elements 36, 37 which are elongated and extend transversely of the direction of travel of the bag forming material and which are relatively reciprocably movable into mutually abutting engagement while the tubular wrapper 20 is interposed between them. Element 37 carries a air of transversely elongated welding plates 39, 40 separated by and located immediately adjacent a notch 41. A transverse blade 42 —which is preferably but not necessarily serrated or jagged—fixed to reciprocating element 36 projects outwardly beyond element 36 in the direction of element 37 in register with notch 41.

As reciprocating elements 36, 37 are relatively moved into mutual engagement with interposed tubular wrapper 20, the wrapper is transversely heat sealed along two spaced apart lines defined by welding plates 39 and 40. Thus, lower welding plate 40 effects heat sealed closure of the top of a bag 38 already filled with articles, while upper welding plate 39 heat seals closed that portion of continuous tubular wrapper 20 above bag 38 to thereby create the bottom of the next bag 30 being formed. At the same time, blade 42 performs a transverse cut between the upper and lower heat seal closures as the blade enters notch 41 whereby the full bag 38 is detached from the overhanging bag 30 on which a bottom closure has concurrently been created.

Figure 15:
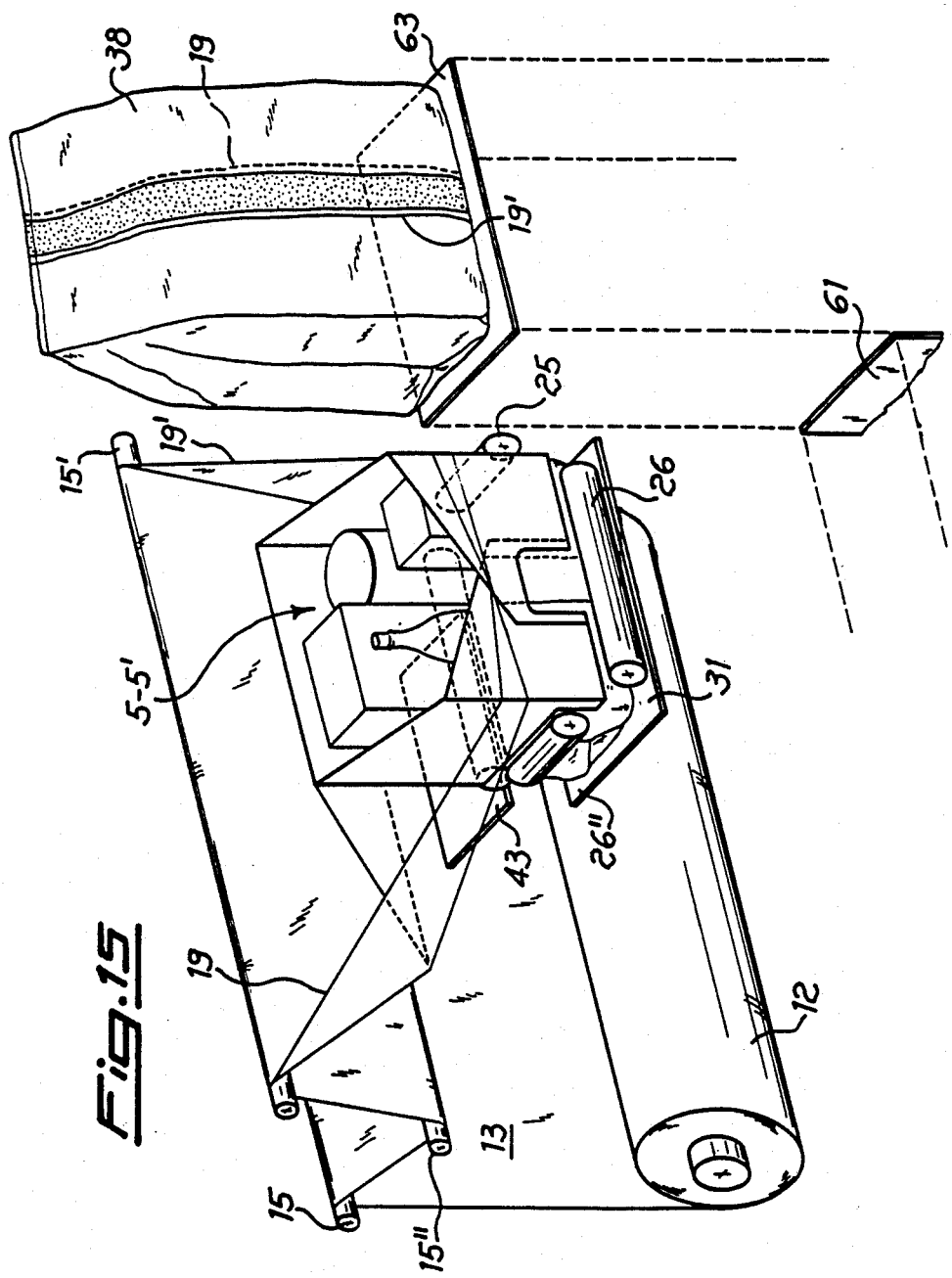

A platform 43 for temporarily supporting the bottom of the bag 30 being formed is arranged for substantial horizontal movement between a first position above reciprocating elements 36, 37 and immediately under the bottom of the bag 30 (FIGS. 6, 13) and a second position laterally remote from said first position (FIG. 15). This movement of the platform 43 is effected by selective bidirectional rotation of a pair of lead screws 45 along which nuts 44 fixed to opposite ends of platform 43 are threadedly engaged. Lead screws 45 carry on their ends gears 46 and are rotated by operation of bidirectional motor 49 through a gear 48 on the motor shaft and a timing or toothed belt or chain 47 connecting the gears 46 and 48. Platform 43 is brought to and attains its first position immediately under the bottom of the bag 30 being formed when, upon detachment of the full bag 38 supported by loading platform 31, reciprocating elements 36, 37 begin to move apart so that the tubular wrapper is no longer gripped therebetween. The presence of platform 43, in its first position, thereby permits the introduction of articles into the new bag 30 being formed even before the full and sealed bag 38 has been moved to a discharge or ejection station by platform 31 and platform 31 is thereafter returned to its bag supporting position. Thus, platform 43 enables the entire loading process to be accelerated although, if desired, platform 43 may be omitted in which case the loading of the new bag 30 will await the return of platform 31.

The bags formed by the apparatus are preferably gusseted or pleated. The device for gusseting the bags may be seen, for example in FIGS. 6 and 12, where two pairs of folders 50, 51 and 52, 53 are disposed for pivotally reciprocating movement about pins 54, 55 along two horizontal planes respectively above and below reciprocating elements 36, 37. Inward movement of the folders from their FIG. 12 extreme outer position carries their free ends into engagement with the opposite sides of the now tubularly formed wrapper 20 for the purpose of forming a pleat or gusset on each of the opposite sides of the bag 30 being formed and of a filled bag 38 which is about to be sealed closed. Folders 50, 51, 52 and 53 are driven by any suitable reciprocating drive means (not shown) in timed relation with the various other operating elements of the apparatus as will hereinafter be described.

The means for ejecting a sealed, full bag 38 is seen in FIGS. 3 and 5 and comprises a motor 57 whose shaft or shaft extension is threaded as a lead screw and threadedly engages a lead screw nut 59 to which a bracket 60 is connected. Bracket 60 is driven along a substantially horizontal plane guided by elongated rods 58, 58' which are disposed parallel to the shaft of motor 57 and which are slidably journalled through apertures defined in lead screw nut 59. Attached to bracket 60 for movement therewith is a substantially vertical pusher 61 for shifting a full bag 38 which has been detached from the continuous tubular wrapper 20, from the fully lowered loading platform 31 to a discharge or ejection platform 63, as will be more fully described hereinafter. The shifting of bag 38 takes place between opposed lateral walls 71, 71' which maintain the orientation of the bag 38. The movement or shifting of bag 38 is preferably along a fixed planar surface 62 interposed between the lowered platform 31 and discharge platform 63, although fixed surface 62, while desirable, is not necessary to this invention.

In one form of the invention, platform 63 discharges a completed and packed bag 38 by vertically raising the bag 38 up to and through, in the raised position of platform 63, a discharge or ejection opening 7 (see FIG. 1) defined in the top surface of counter 1. This will permit a full bag 38 to be easily picked up and removed by the customer. Such an arrangement for vertically reciprocating the is charge platform 63 may of course take a variety of constructions. As shown by way of illustration, the discharge platform raising and lowering means includes a bracket 64 secured to the bottom of platform 63 and fixed to a lead screw nut 65 threadedly engaged for vertical movement along a rotatable lead screw 67 (see FIG. 5). Depending upon the direction of rotation of lead screw 67, discharge platform 63 will move up or down between its fully lowered position adjacent stationary planar surface 62 (if used) and a raised position, preferably below ejection opening 7 in counter 1. A pair of guide rods 66, 66' parallel to lead screw 67 and slidably journalled through lead screw nut 65 provide enhanced guidance for the lead screw and for the movement of platform 63.

In an alternate embodiment (FIG. 2), platform 63 is not vertically movable for discharging a full bag 38 through counter opening 7 (which is omitted) but may, instead, be arranged for lateral and/or ramped transport of the full bag to an opening defined in a vertical side or end wall of the check-out counter. In such an arrangement, described hereafter in further detail, the full bag 38 is nevertheless also thereby delivered to a position readily and conveniently accessible to the customer for pick up and removal of the filled bag.

Figure 9:
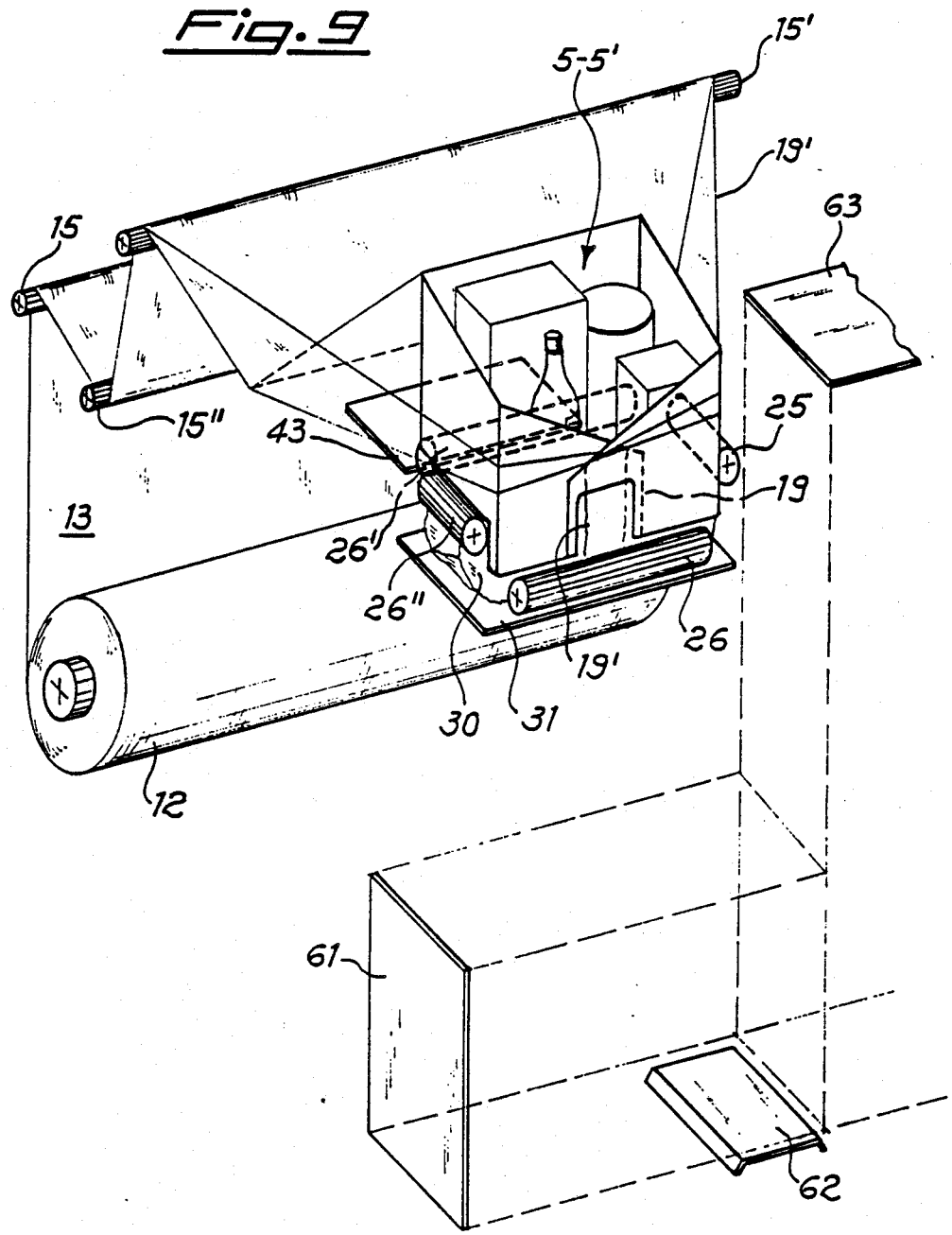
FIGS. 9 to 15 are partial schematic perspective views of the apparatus during the various phases of the process of filling and forming a custom-sized bag in accordance with one embodiment of the invention.
Figure 13:
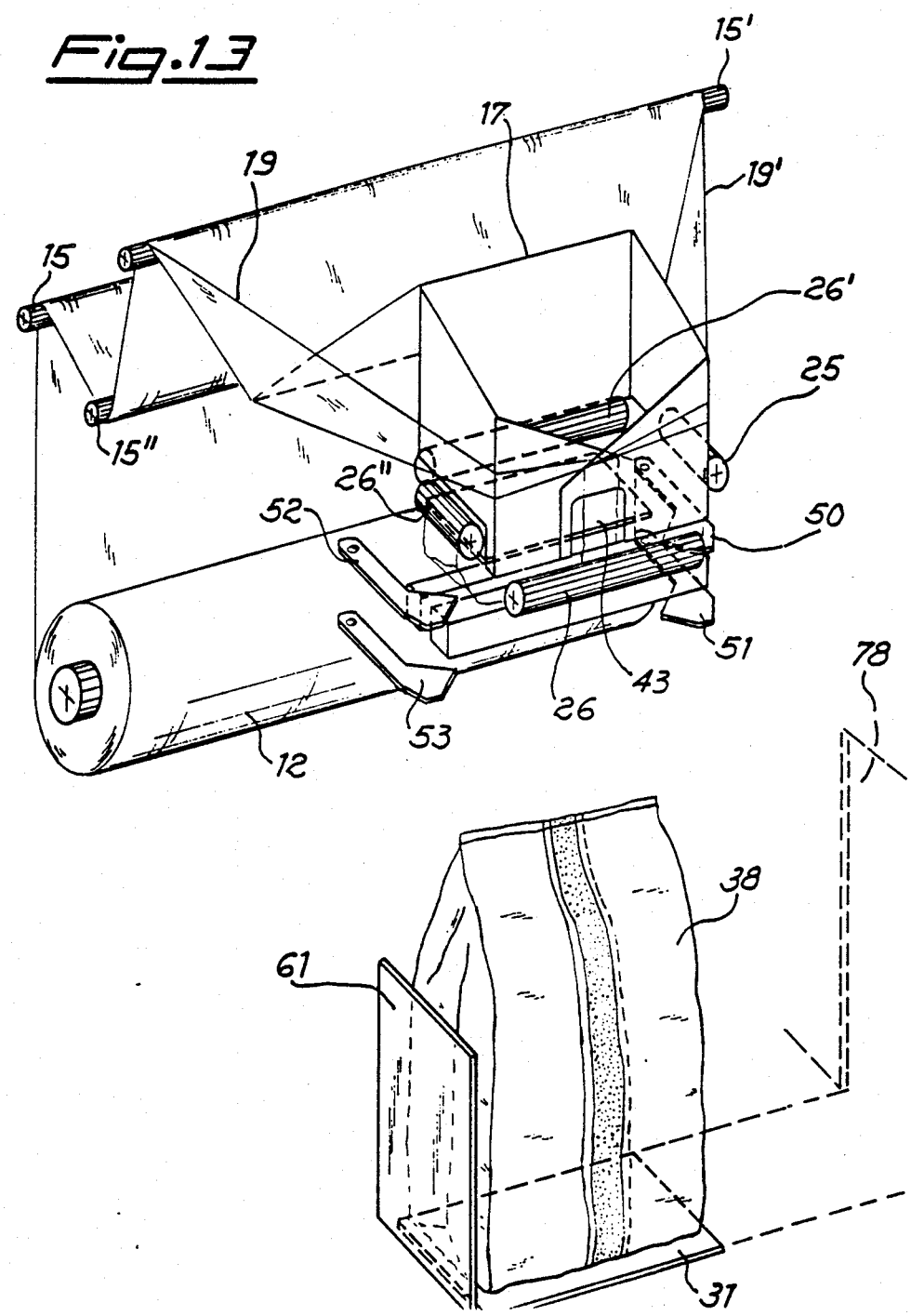
Figure 14:
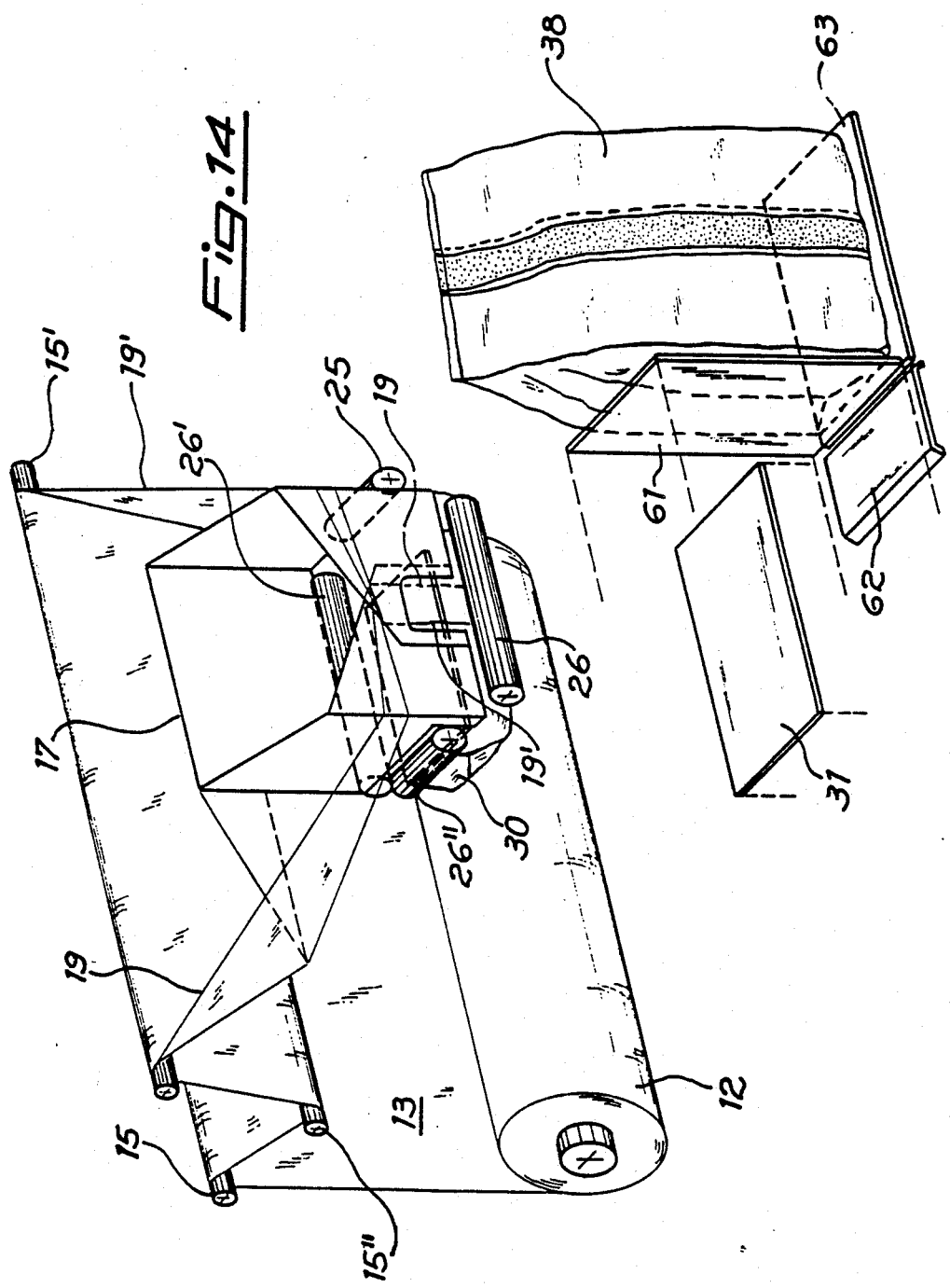

The bag forming apparatus of the invention is also provided with means for determining the position or relative position of loading platform 31 along the vertically reciprocated path between its fully raised position see in FIG. 9 and the FIG. 13 fully lowered position. If planar surface 62 is employed, the fully lowered position is adjacent to and substantially level with the planar surface 62. It will be recalled that platform 31 is reciprocated through motor driven rotation of vertically disposed lead screw 32 as, for example, by an end-mounted gear 115. In the disclosed form of the invention, the platform position determining means comprises a disc 116 mounted on and rotatable with threaded bar 32, and a sensor 117 for detecting rotations of disc 116 (FIG. 3). The combination of disc 116 and sensor 117 may take any of a variety of forms such, for example, as an optically-readable marking or delineation on the disc for detection by optical sensor 117 with each rotation of threaded bar 32 and disc 116 or, in another arrangement, a structural projection from a cam-like disc 116 for actuating engagement with a mechanical switch or sensor 117 as the disc rotates with lead screw 32. By counting the number of rotations carried out by lead screw 32 as platform 31 is raised and lowered, changes in the position or height of the platform can be fairly precisely determined in conjunction with the platform distance known to be traversed during each rotation of lead screw 32. And, given the initial position or height of platform 31, its final position following each subsequent movement will likewise be known.

Those skilled in the art will of course recognize that numerous alternative and/or supplemental arrangements may be employed to monitor or track the position of and amount of vertical movement undergone by loading platform 31. Such alternate implementations, which may or may not use or depend upon the rotation of bead screw 32, are nonetheless within the scope and contemplation of the invention.

In accordance with a particular feature of the invention, it is, as will hereinafter become evident, desirable in some forms of and applications for the bag forming apparatus to monitor the weight of a bag 30 being formed as articles are placed or packed therein. For this purpose, a flat plate-type sensor 118 (FIG. 3) may be carried on loading platform 31 so that a bag 30, during the placement of articles therein, is directly supported on the weight sensor 118 which is thus interposed between platform 31 and the bag 30. Sensor 118 may comprise any convenient and conventional apparatus capable of generating an output related to the weight of an object supported thereon to the controller of the inventive bag forming and check-out counter system. Preferably, for reasons that will become apparent as this description proceeds, sensor 118 has an accuracy sufficient to resolve, with a precision appropriate to the application, weight differences o the order of anticipated changes in the weight of a bag 30 supported on platform 31 as each item to be packed is individually placed into the bag. It is, of course, also within the contemplation of the invention that sensor 118 or a functionally equivalent means be provided at a location other than atop platform 31 for measuring the weight and changes in weight of a bag 30 being filled or packed with articles 5, 5'.

The bag forming apparatus additionally includes upper and lower pairs of sensor arrays 68, 69, respectively, operable for detecting the relative volume or level to which articles have been received within a bag 30 being formed. Each of the sensor array pairs may, for example, comprise conventional infra-red optical transmitter-receivers which emit and are sensitive to the receipt of low frequency infra-red emissions capable of penetrating films—whether or not transparent—of the type used for material 13 from which bags are formed by the apparatus of the invention. The infra-red rays are, on the other hand, obscured by and will not fully pass through the relatively solid articles packed in the bags 30. Thus, each of the upper and lower sensor array pairs 68, 69 forms an electronic or optical curtain capable of detecting the passage of the relatively solid articles to be packed through the substantially planar zone defined by each pair of sensors.

Figure 10:
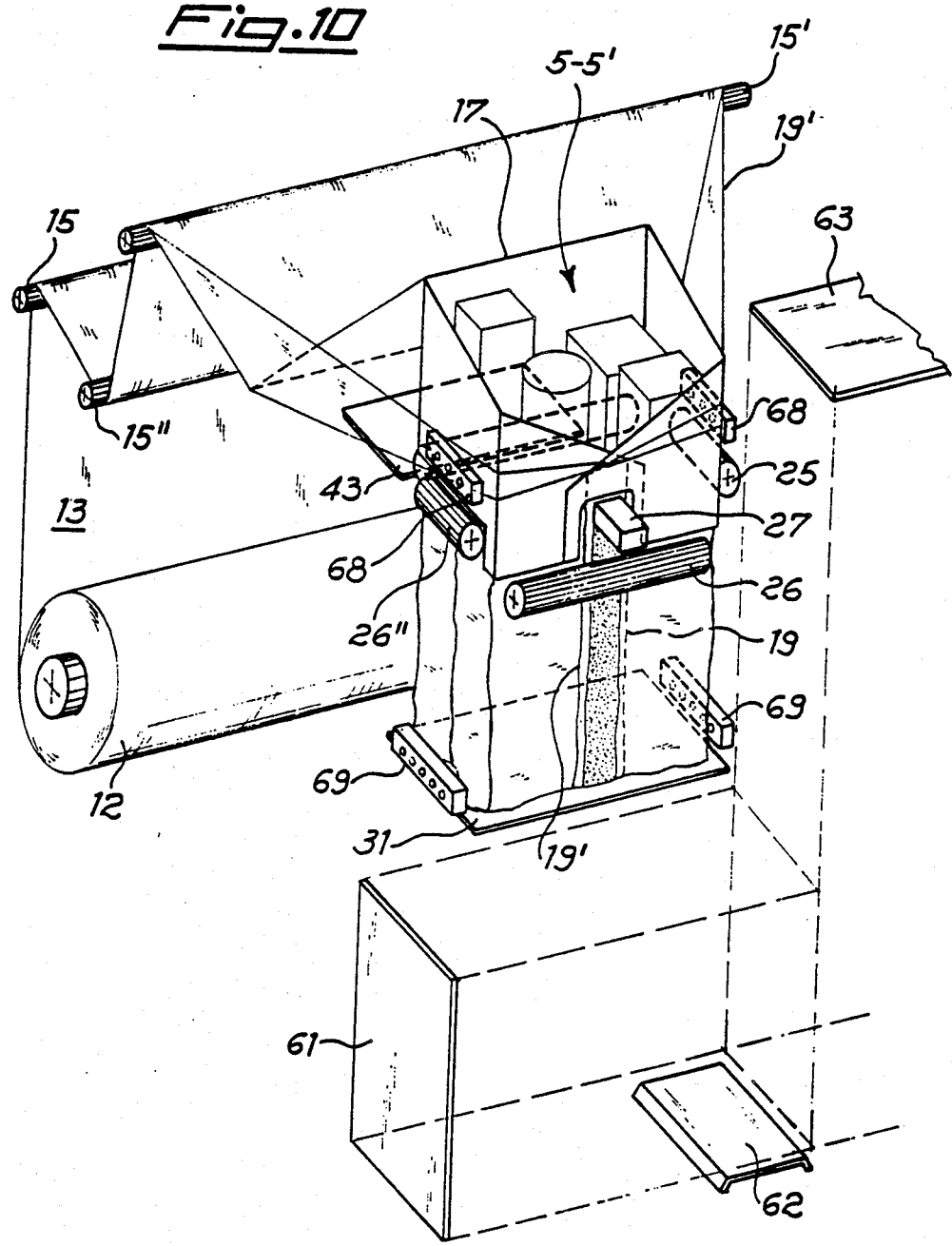

Upper sensor arrays 68 are horizontally positioned and relatively aligned externally of the opposed sidewalls of former 17 at the upper portion of the former and, preferably, immediately under counter 1 (see, for example, FIGS. 3 and 10). Arrays 68 are additionally aligned with cutouts defined in former 17 and in collar 8 through which the infra-red rays are thereby permitted to pass for detecting the passage of articles into a bag 30 being formed and the height or level of articles inserted into the bag. Lower sensor arrays 69, also horizontally aligned relative to each other, are positioned below reciprocating elements 36, 37.

The various functional elements and assemblies of the bag forming apparatus are connected to and sequentially operated in accordance with the invention by a controller (not shown). Because the controller, which may take any of a variety of mechanical, electromechanical, electrical and/or electronic forms well know in the art, is deemed to be within the mechanical ability of one skilled in the art having knowledge of this disclosure, its details are not specifically disclosed herein. Such a controller may nevertheless be readily implemented without undue experimentation in accordance with the teachings of the invention.

The operation of the bag forming apparatus may be best understood with reference to FIGS. 9 to 15 which sequentially illustrate the formation and completion of a custom-sized bag containing a plurality of goods or articles 5, 5'. In FIG. 9, the bag 30 is supported at its bottom by loading platform 31 which is located in its uppermost raised position. It is of course preferred that goods be so placed in the bag 30 as to most fully and efficiently exploit the available space inside it. The bag forming machine permits and facilitates an intelligent and efficient distribution of articles placed inside the bag in that, during this operation, platform 31 (and therefore the bag 30 supported thereon) is maintained in its fully raised position shown in FIG. 9.

When the bag 30 has been substantially filled with articles, and there remain additional goods to be packed, the longitudinal dimension of the bag may be increased by actuation of a manual control or pushbutton 70 provided for example on the top surface of counter 1. Control 70, which may be manually actuated by either the cashier or the customer, is connected to the apparatus controller and, when operated, causes a predetermined rotation of rollers 14, 14' to further unwind film 13 from about roll 12. Roller 25, 26, 26' and 26" are also actuated to advance the film downwardly within former 17, thereby extending the length of tubular wrapper 20 as the longitudinal edges 19, 19' of the advancing film 13 are heat sealed together. At the same time, threaded bar 32 is rotated to lower the loading platform 31 by a preset distance, as for example 24 cm, until the bottom of the bag 30 which is supported on platform 31 reaches a position immediately below lower sensor arrays 69 (FIG. 10).

Figure 11:
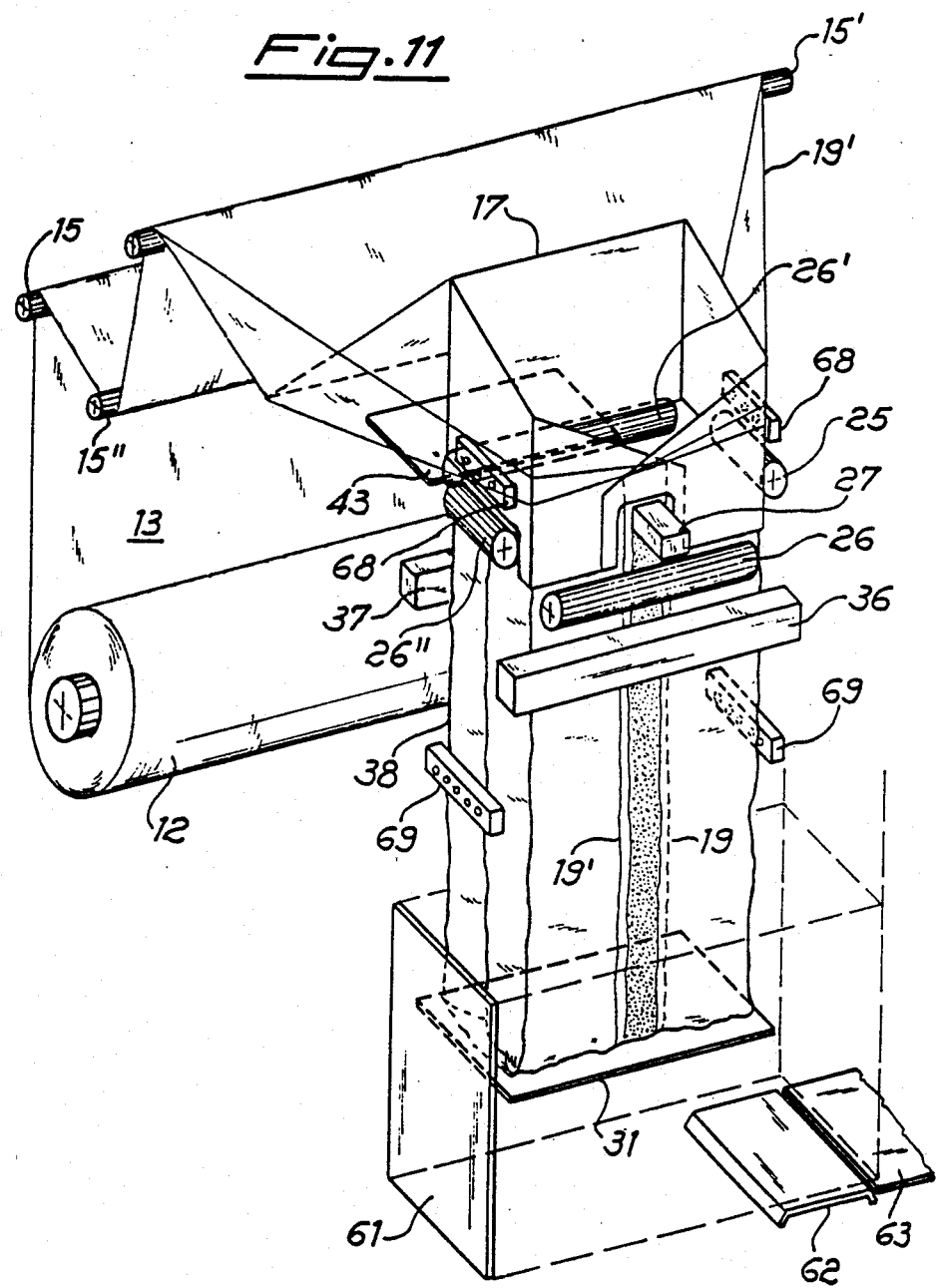

During and following the completion of this first descent of loading platform 31 the loading of articles into the bag 30 continues until either there remain no additional goods to be packed or all of the available space within the bag has been filled. In either case, the cashier or customer once again manually actuates control 70 causing loading platform 31 to resume its descent as seen in FIG. 11. This second descent of platform 31 is automatically halted when all of the articles packed in bag 30 descend below lower arrays 69 and the infra-red rays are thus no longer blocked by articles packed within the bag. At this point, then, the maximum level reached by the goods packed in the bag 30 is positioned immediately below the level of lower sensor arrays 69.

Although the bag forming apparatus of the invention is capable of producing bags of various lengths customsized in accordance with the quantity or volume of goods packed in the bag, the apparatus is preferably constructed for forming bags up to a predetermined maximum length. The length of the maximum size bag formable by the apparatus may be determined or preset on the basis of a number of factors including the size and height of the check-out counter within which the apparatus is incorporated and the ability of the average customer to conveniently transport the resulting filled bags from the store. In any event, the descent of loading platform 31 may also be halted automatically by a determination that the bag has been loaded with goods to a height which would otherwise result in a bag larger than the maximum size bag formable by the apparatus. This feature is implemented by monitoring the output of top sensor arrays 68 when, during the descent of loading platform 31, the platform reaches a distance from the top arrays equal to the maximum predetermined height that a bag formed by the apparatus may have. When platform 31 has reached this point in its descent and top arrays 68 continue to detect the presence of articles between them, further descent of platform 31 is halted and a signal—such as an audible and/or visible alarm—is generated to alert the operator that the bag contains an excessive volume of goods. The operator must then remove a quantity of articles sufficient to clear the area between top arrays 68 and, once done, downward movement of platform 31 resumes. As previously indicated, the descent of the platform is automatically halted when the topmost articles in bag 30 pass below lower arrays 69 and the sensors of the lower arrays are thereby once more illuminated.

In addition to assuring that the maximum height of bag 30 is limited to a predetermined size for, inter alia, the convenience of the customer, it is also desirable to provide that the completed bag be of no more than a predetermined maximum weight which, similarly, may be conveniently borne by the customer in transporting the bag from the store or which represents the maximum weight such a bag can securely carry. Weight sensor 118 on loading platform 31 generates an output which is continuously monitored by the controller and, should the weight of the goods-containing bag 30 meet or exceed the predetermined maximum permissible weight of the bag, an alarm is generated and the loading platform automatically initiates its descent to that position in which the topmost goods in the bag are disposed immediately below lower sensor arrays 69. In this manner, the apparatus assures that the bag which is formed is of no more than a predetermined weight readily transportable by the customer and contains goods having a combined weight suitably within the elastic limits and tensile characteristics of the film material 13 from which the bag is formed.

In the event that all of the articles to be packed have been placed and fit within the bag 30 while loading platform 31 remains in its uppermost (FIG. 9) position, it is not, of course, necessary to perform the second phase of loading during and following a subsequent descent of platform 31 to its secondary (FIG. 10) position. Under these circumstances, the operator instead manually actuates or depresses pushbutton 70 twice in succession whereby platform 31 descends not by the preset amount normally traveled from its uppermost position but, rather, through a free run which stops as soon as the topmost goods packed in the bag 30 clear and are disposed immediately below the level of lower sensor arrays 69.

In each of the foregoing situations, when pushbutton 70 is actuated for a second time (or weight sensor plate 118 detects that the total weight of the packed goods meets or exceeds a predetermined maximum value) and the topmost goods in bag 30 are positioned below top arrays 68, the downward movement of ejection platform 63 from its then current position to its lowermost position (FIG. 11) substantially level or coplanar with fixed planar surface 62 is automatically initiated. This descending movement of ejection platform 63 is effected in a single, continuous and uninterrupted motion.

Figure 12:
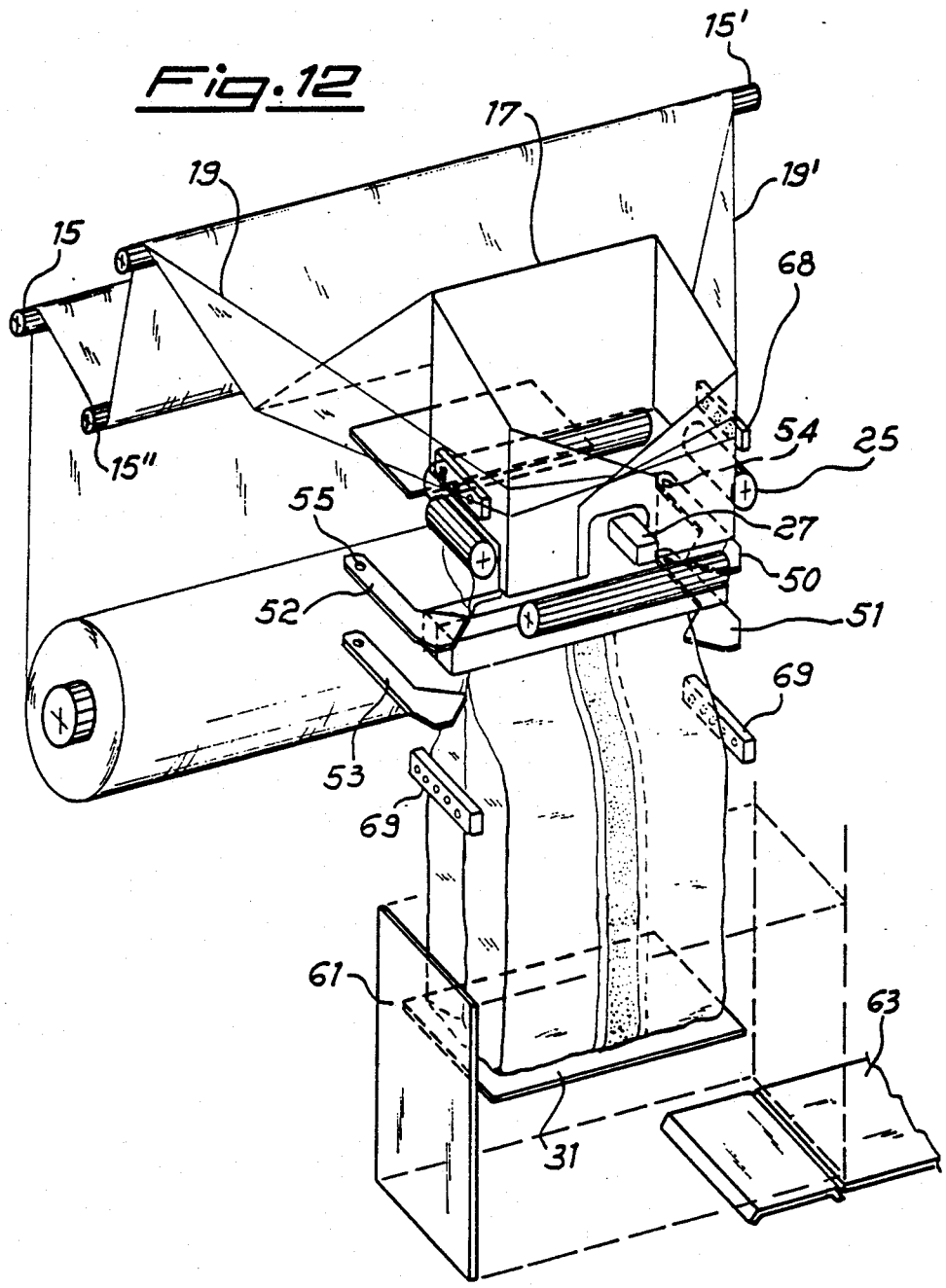

The closure or sealing of the bag 30 is carried out when loading platform 31 has completed its descent to that point at which the topmost goods packed in the bag have passed below and thereby reilluminated lower sensor arrays 69. The bag sealing and separating operation, which is depicted in FIGS. 12 and 13, is initiated by such reaction, e.g. reillumination, of lower arrays 69 as the articles contained within the full bag 38 descend below and clear the lower arrays. Reciprocating elements 36, 37 are then relatively moved into heat sealing engagement with the opposed faces of the full bag 38 which, as seen in FIG. 7, is sealed closed by welding plate 40. A the same time, welding plate 39 creates the bottom-defining closure seal of the new bag 30 above full bag 38 and blade 42 cuts the film between the two seals thereby detaching the full bag 38 from the new bag 30 being formed (FIG. 12).

Concurrent with the approach of reciprocating elements 36, 37, the opposed pairs of folders 50, 52 and 51, 53 are pivoted into respective engagement with the opposed sides of the new bag 30 being formed and the full bag 38 about to have its upper edge heat-sealed closed. Engagement of the folders with the bags 30, 38 creates longitudinal pleats or gussets along the sides of each bag as best seen in FIG. 12.

Referring now to FIG. 13, following simultaneous heat sealing closure of the full bag 38 and creation of the bottom of new bag 30, and the cutting of film 20 therebetween by cutting edge 42 (FIG. 8) to separate the two bags 38 and 30, the reciprocating elements 36, 37 separate slightly so as to free the now-closed top edge of the full bag 38. At this time rotation is once again imparted to lead screw 32 so that platform 31 resumes its descent until reaching its lowermost position which is coplanar with ejection platform 63, and, if employed, with adjacent fixed planar surface 62.

The reciprocated separation of the heat sealing elements 36, 37, in addition to freeing the top edge of now completed bag 38, also releases the newly-formed bottom seal of the new bag 30 on continuous tubular wrapper 20. As the elements 36, 37 begin to separate, temporary support platform 43 begins its lateral translation from the position shown in FIG. 12 to that illustrated in FIG. 13 above reciprocating elements 36, 37 and immediately below the now heat-sealed and closed bottom of the new bag 30 being formed. The bottom of this new bag 30 may thus rest and be supported on platform 43 so that the placement of goods in the new bag may begin immediately—i.e. before ascending return of loading platform 31 and completion of the previous operation cycle relating to the now filled and sealed bag 38.

When both loading platform 31 and ejection platform 63 are in their lowermost positions nd at the same level, motor 57 is operated to move pusher 61 rightward from its FIG. 13 position and thereby shift completed bag 38 from loading platform 31 and onto ejection platform 63 (FIG. 14) over fixed support 62, if employed. Ejection platform 63 then commences to ascend and travels to its uppermost position shown in FIG. 15, carrying with it the completed bag 38 to a height such that at least a portion of the bag 38 projects outwardly through and above discharge opening 7 in counter 1. In this position the bag 38 may be comfortably and conveniently removed by the customer.

Concurrent with the ascending travel of ejection platform 63, lead screw 32 is rotated to raise and return loading platform 31 to its initial position (FIG. 9) immediately under and supporting the new bag 30 being packed with goods. Platform 31 thereby takes the place of support platform 43 which has been moved laterally and thereby returned to its initial position (FIG. 15).

It should be noted that during the ascending return movement of loading platform 31 from its fully lowered (FIG. 13) to its fully raised (FIG. 15) position, gusset formers or folders 50, 51, 52, 53 are in their open or outwardly rotated condition and reciprocating elements 36, 37 are likewise fully separated. Also as loading platform 31 ascends, pusher 61 is returned to its initial position (FIG. 13) in preparation for the bag filling, sealing, and discharge phases of the next operation cycle of the bag forming apparatus.

The embodiment of the bag forming apparatus of the invention thus far disclosed additionally preferentially incorporates, both structurally and in its operation, several means for assuring both the safety of the operator and the continued integrity of various operating portions of the machine. For example, a sensor, which may be implemented utilizing conventional photoelectric devices, may be provided just below the top edge and within discharge opening 7 for detecting whether a sealed and completed bag 38 carried through opening 7 by ejection platform 63 has been removed therefrom by the customer. In the event that the bag has not yet been removed at that point in the operating cycle of the apparatus at which descent of ejection platform 63 would otherwise begin, an acoustic and/or visual signal may be generated to alert the operator and/or customer that the full bag must be removed, and descent of the ejection platform is appropriately delayed and prevented until removal of the bag from within discharge opening 7 has been effected.

Sensor arrays 68, 69 are also preferably employed in carrying out safety-related aspects in the operation of the bag forming apparatus of the invention. It is, for example, desirable to prevent injury to an operator and/or customer should an individual's hand or other object be inserted into counter opening 6 during operative motion of such elements as the reciprocating elements 36, 37 and the support platform 43. Toward this end, all the reciprocating motions of heat sealing elements 36, 37 and the lateral translations of support platform 43 are preferably immediately disabled when the sensors of top array 68 are blocked by an object placed therebetween as, for example, through opening 6. When elements 36, 37 or platform 43 are already in motion when an object is detected between arrays 68, such motion may be simply discontinued or the direction of movement thereof may be automatically reversed to further minimize the risk of personal injury.

The sensor arrays 68, 69 are also used to prevent possible damage to the reciprocating elements 36, 37 should these elements be moved together into heat sealing relation with the film while one or more articles are disposed between them. Although the normal operation o the apparatus—in that the approach of the elements 36, 37 takes place only after the lower arrays 69 detect that the topmost goods packed in the bag 30 have cleared and descended below them—generally suffices to insure that no articles remain between the elements, there are unusual circumstances in which such a determination may not necessarily be dispositive. Where, for example, the elongated neck of a water bottle (through which the infra-red sensor rays may pass) projects above the topmost other goods in the bag 30, the output of the lower arrays 69 may be falsely interpreted to indicate that all articles in the ba have descended therebelow although, in fact, the neck of the water bottle projects upwardly beyond the lower sensors and into the path of the approaching heat sealing elements 36, 37. In order to avoid such an occurrence, an independent confirmation that all of the goods have indeed passed below lower arrays 69 may be required before enabling heat sealing approach of reciprocating supports 36, 37.

If employed, as shown and preferred, such independent confirmation may take a variety of forms. In the presently disclosed embodiment of the invention, this feature is implemented by comparing the position of loading platform 31 at two instances—first, when the upper sensor arrays 68 detect passage of the topmost articles packed in the bag 30, and second, when the lower sensor arrays 69 detect passage therebelow of the topmost articles packed in the bag. Only when the difference in those two sensed positions of loading platform 31 is at least as great as the known distance between the upper and lower arrays 68, 69 will reciprocating elements 36, 37 be operated to move them into heat sealing relation with the tubular film wrapper 20. Where on the other hand the difference in the sensed positions of platform 31 as the topmost articles in bag 30 pass each of the upper and lower sensor arrays 68, 69, respectively, is less than the known fixed distance between the upper and lower arrays, platform 31 is lowered by an additional distance corresponding to that difference before reciprocating elements 36, 37 are permitted to begin their film sealing approach.

Thus, in the above-mentioned example wherein a water bottle neck protrudes above the topmost other goods in the bag 30 and lower sensor arrays 69 produce an incorrect determination of the maximum height of the goods in the bag, upper sensor arrays 68 will nonetheless properly register the top cap of the bottle (which obscures the infra-red rays of the top sensors) as the water bottle cap passes and descends below upper arrays 68. Thus, although it appears to lower arrays 69 that all of the articles in bag 30 have cleared the lower arrays even though the neck of the water bottle has not, the reciprocating elements 36, 37 are prevented from moving into heat sealing relation with the film until loading platform 31 descends by an additional amount sufficient to move the entire water bottle below sensors 69. As previously described, sensing of the position of loading platform 31 may be carried out in a variety of ways including, for example, tee combination of disc 116 on threaded bar 32 and cooperating sensor 117 (FIG. 3).

As previously indicated, the bag forming apparatus of the invention may be implemented in a number of modified and/or alternative embodiments each particularly suitable for specific applications or environments. For example, one such modification renders the apparatus especially suitable for operation by even the most inexperienced users—such as the customers themselves —through the provision of additional safety-related elements and features.

Thus, the check-out counter of FIG. 2 differs from that illustrated in FIG. 1 primarily, but not exclusively, by the inclusion of a cover 74 movably closing the opening 6 and the omission o discharge opening 7 in the top surface of the counter. Cover 74, which is pivotally movable about securement hinges 75 and is user-graspable at its handle 76 (FIG. 16), is operatively coupled with various elements of the bag making apparatus incorporated within the check-out counter as will now become evident with reference to FIGS. 16 to 21. It should in any event be understood that, except as otherwise noted or required by the following description, the structural and functional characteristics and operating features of the inventive bag forming apparatus are substantially identical to that previously described with respect to the initially disclosed embodiment of the invention.

Figure 16:
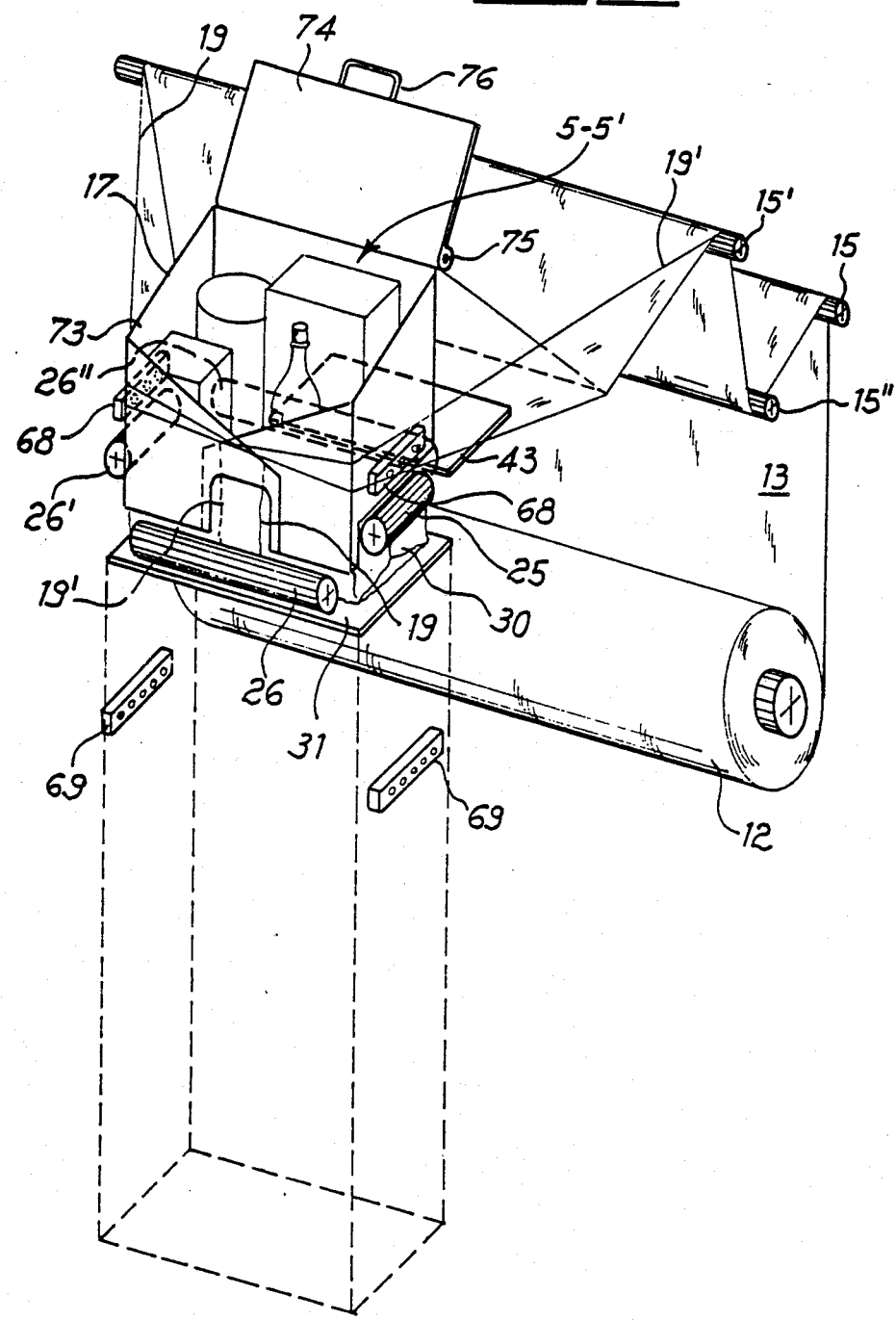
Figure 17:
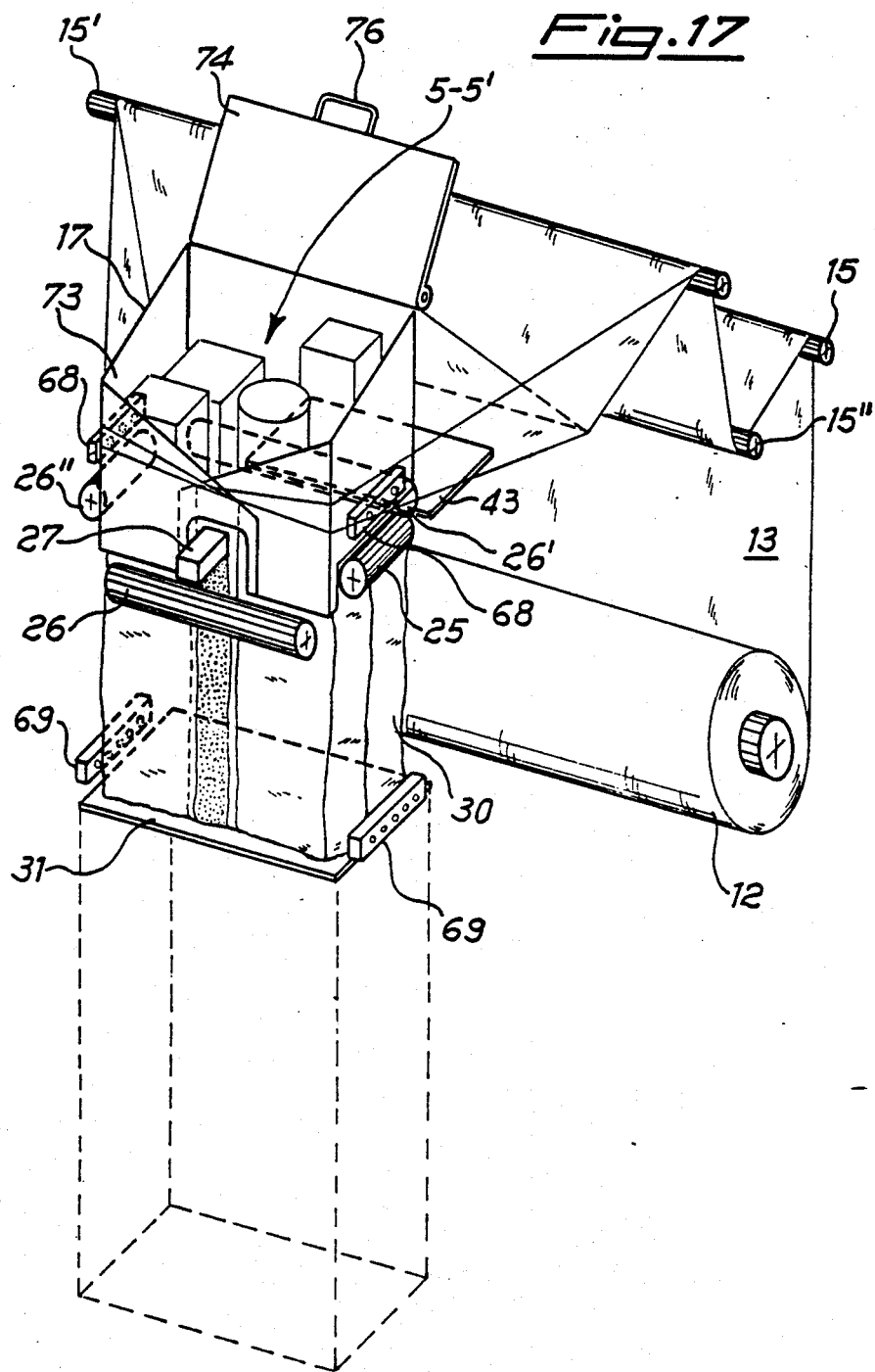
Figure 18:
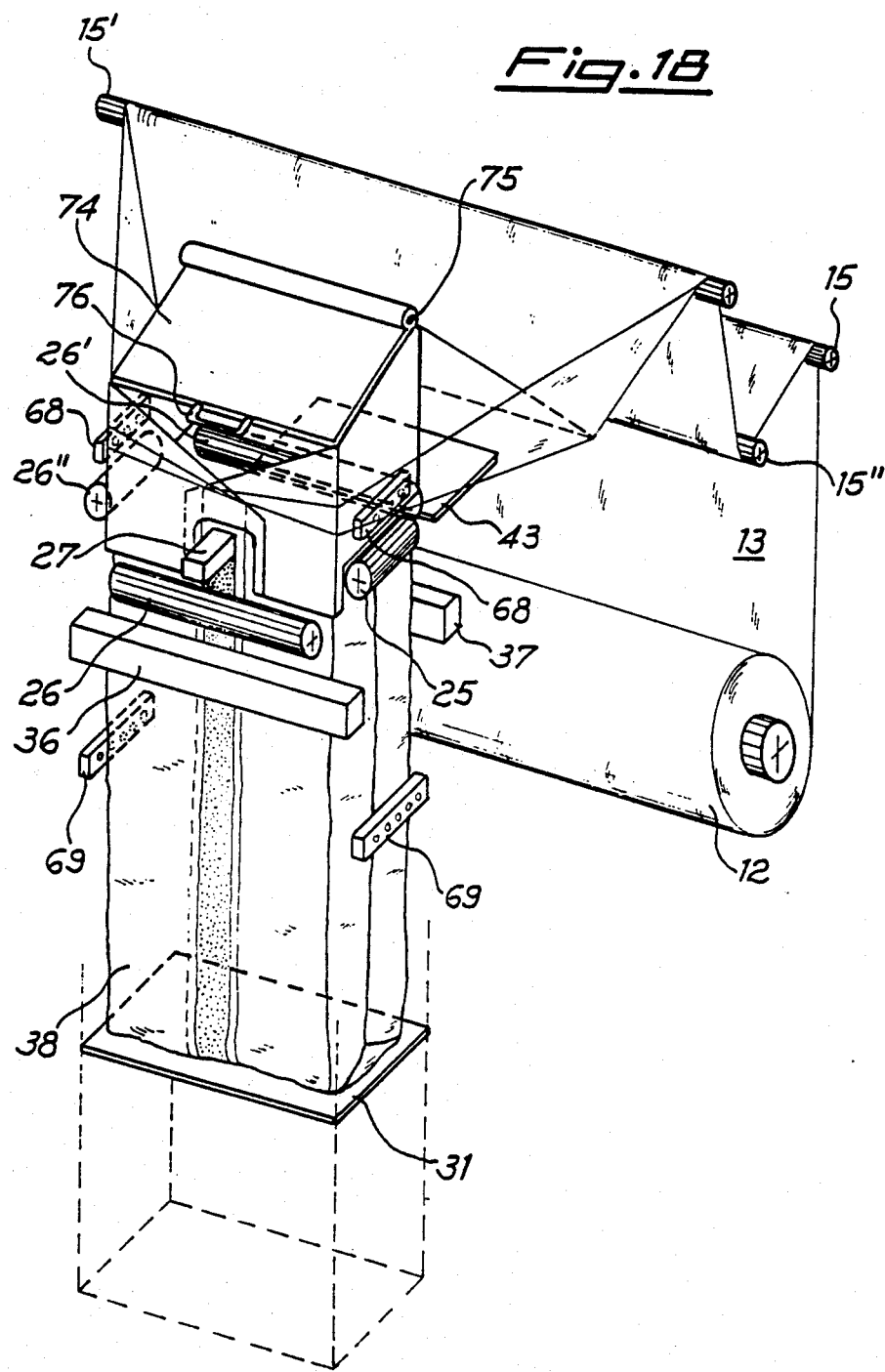

Referring first to FIG. 16, at the beginning of an operation cycle loading platform 31 is disposed below upper arrays 68 and at a predetermined distance from counter opening 6 as, for example, a distance of approximately 22 cm. With cover 74 in its open position, the bag 30 being formed rests at its bottom atop platform 31 and may be filled with articles 5, 5' through the opening 6 in counter 1. As goods are inserted into bag 30, the upper arrays 68 are obscured by the passage of goods thereby and, as the arrays are repeatedly obscured, threaded bar 32 is rotated to slowly lower loading platform 31 from its initial position. In this manner, as articles continue to be introduced into bag 30, the longitudinal dimension of the bag slowly and continuously increases to accommodate the goods so packed (FIG. 17).

Upon termination or interruption of the loading of articles into bag 30, upper arrays 68 are no longer obscured by the passage of articles and the continued descent of loading platform 31 is stopped. If, on the other hand, articles continue to be loaded into bag 30, platform 31 will eventually descend to a predetermined minimum level selected to correspond to the maximum height of a bag formable by the apparatus.

When all articles to be packed have been placed into the bag 30 or, in the alternative, when the bag has been filled to its maximum capacity and platform 31 has descended to the aforementioned minimum level, cover 74 is manually pivoted about hinges 75 to close the counter opening 6. In the event that an excessive quantity of goods has been introduced into the bag 30 so that cover 74 is unable to be pivoted into full closure of opening 6, the customer or operator must remove the excessive articles until cover 74 may be fully closed over opening 6. Preferably, a safety device—as for example a conventional electromagnet (not shown)—then automatically locks over 74 in its closed position so that the customer or operator no longer has access to opening 6 until the cover is subsequently released for the initiation of a new operation cycle of the apparatus.

With the cover 74 closed and locked, loading platform 31 once more continues its descent until lower sensor arrays 69 detect that all goods packed in bag 30 have moved below and cleared the lower sensor arrays 69. At that point, depicted in FIG. 18, downward motion of loading platform 31 is again halted and bag 38 is in position for heat sealed closure of its top and separation from the remainder of the continuous tubular film wrapper 20 from which the bag has been formed.

Figure 19:
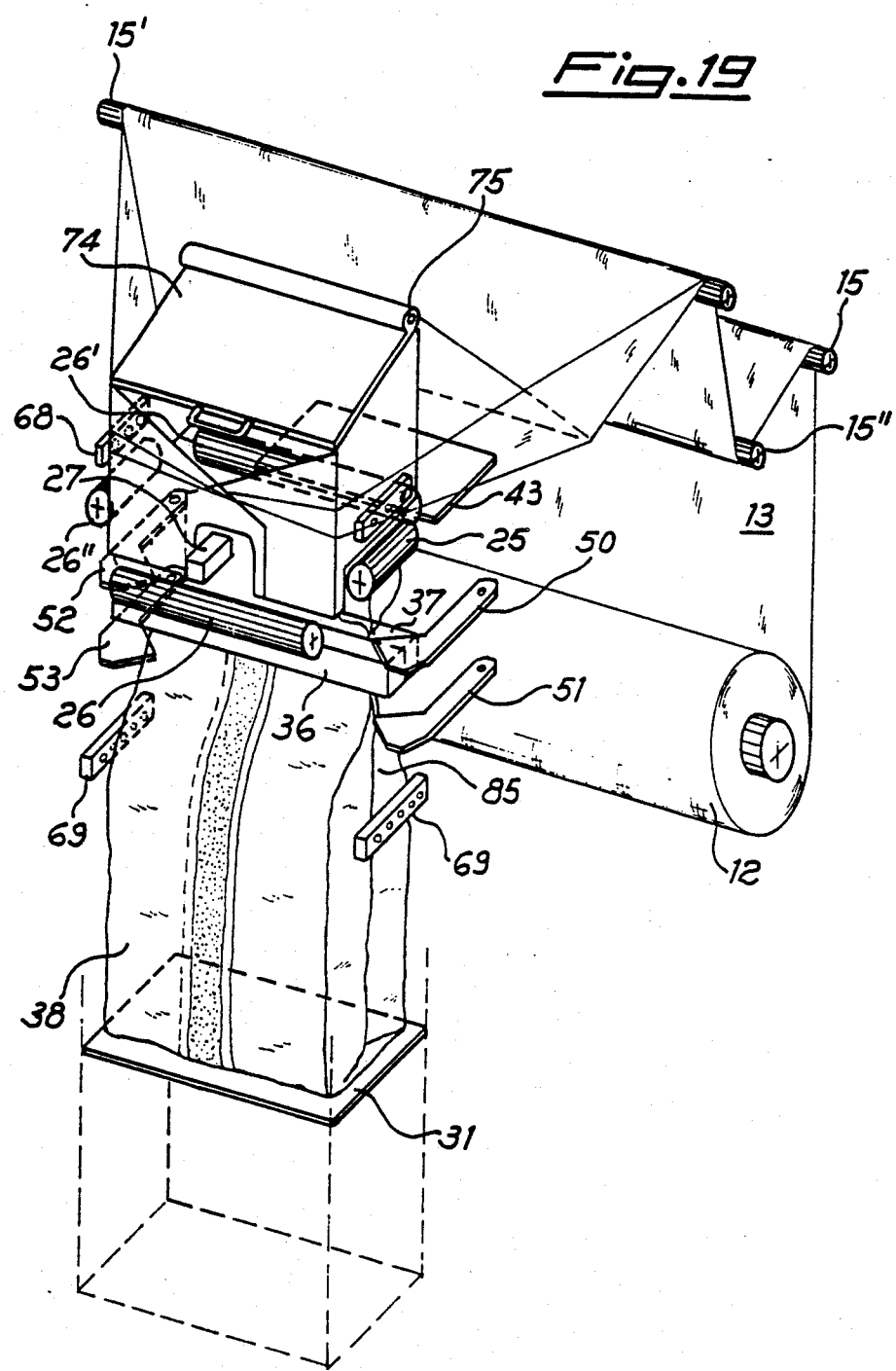
Figure 20:
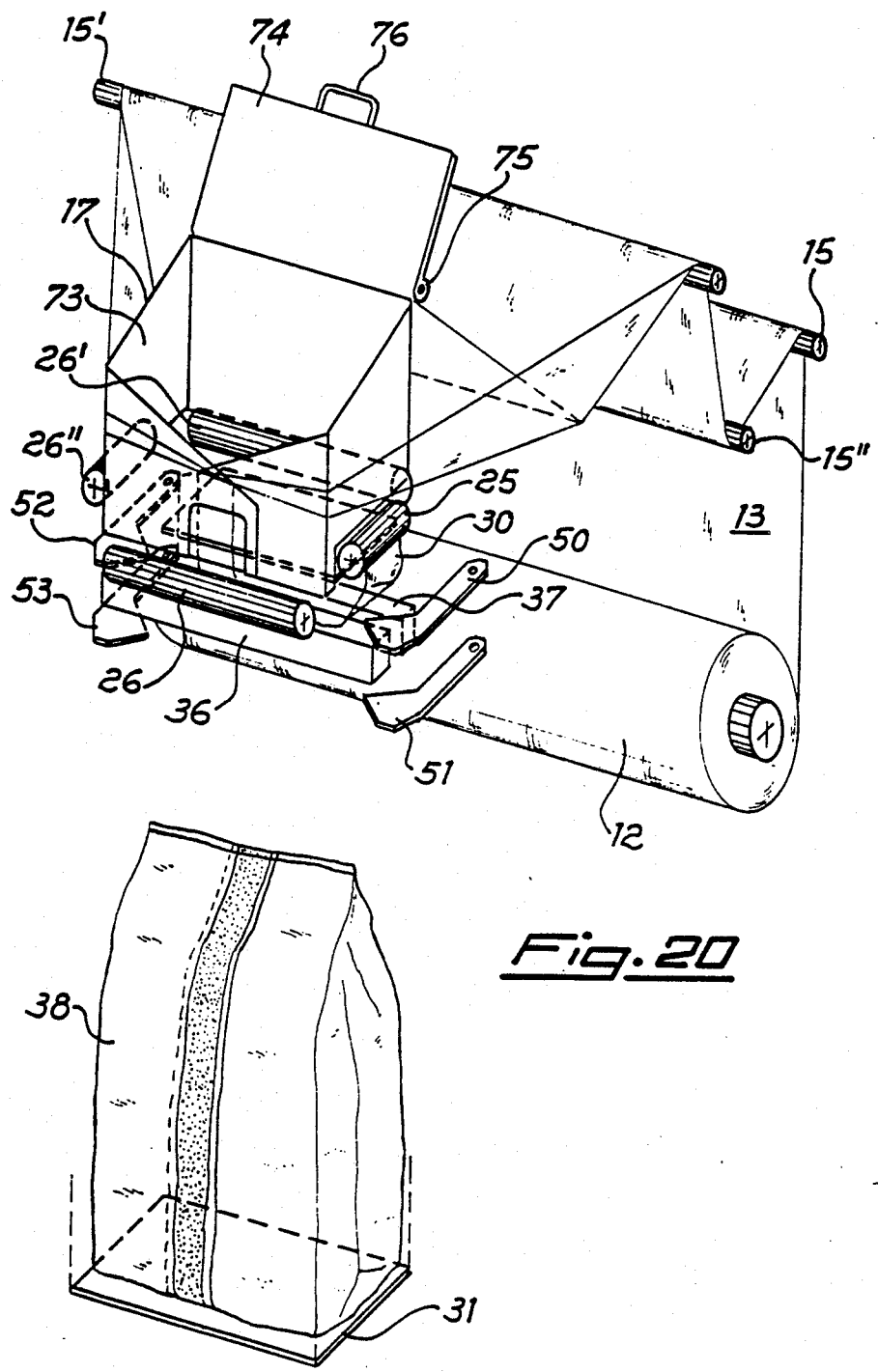

Referring now to FIG. 19, concurrent with the clearance of lower arrays 69 and the termination of downward movement of loading platform 31, reciprocating heat sealing elements 36, 37 are moved relatively together into heat sealing relation with the tubular wrapper of film therebetween. With the approach of elements 36, 37 and their engagement with the film, the top of the full bag 38 is sealed closed, the bottom of the new bag 30 in formation extending upwardly from heat sealing elements 36, 37 is created, and the transverse cut detaching the full bag 38 from the continuous tubular wrapper 20 is performed as previously described in connection with FIGS. 7 and 8. As full bag 38 is now closed at both its top and bottom ends it is ready for discharge from the apparatus and, to this end, platform 31 is further lowered to its lowermost position (FIG. 20).

Completed bag 38 may be discharged or ejected from the apparatus in any of a number of ways. For example, with platform 31 in its lowermost (FIG. 20) position, a motor actuated linkage T may be actuated so that platform 31 is tipped (FIG. 21). Thus bag 38 moves under the force of gravity against and/or through an opening (not shown) in a side or end wall of the check-out counter from which it can be readily picked up and removed by the customer. In another form of the invention, the completed bag 38 may be discharged through a lateral opening aligned with and at the end of the path traversed by the pusher 61 in the first described embodiment of the invention. In that instance, vertically reciprocated ejection platform 63 may be eliminated and replaced with a single continuous planar surface extending between platform 31 in its fully lowered position and a lateral wall opening 78 (shown in broken lines in FIG. 13). In another form of full bag ejection means, the planar surface extending between platform 31 and opening 78, along which bag 38 is advanced by pusher 61, is upwardly inclined toward the opening so that the bag is discharged from the apparatus at a height conveniently accessible to the customer for removal of the discharged bag. Of course, other bag ejection means and arrangements are also within the scope and contemplation of the invention.

Following ejection of the full bag 38 from the apparatus, loading platform 31 reascends to its uppermost position and there takes the place of support platform 43 which is concurrently returned to its laterally removed position, all as depicted in FIG. 16. As in the first described embodiment of the bag forming apparatus, support platform 43 is transversely moved from its laterally removed to its more central position for supporting the new bag 30 being formed following creation of the bottom seal on new bag 30 and detachment therefrom of the full and sealed bag 38. In this manner, as previously described, articles may be introduced into new bag 30 even before completion of the prior operation cycle of the apparatus. Thus, as soon as the bottom of new bag 30 is supported by platform 43, cover 74 is automatically released and may be opened by the customer or operator to enable the insertion of articles through opening 6 and into the new bag.

Figure 25:
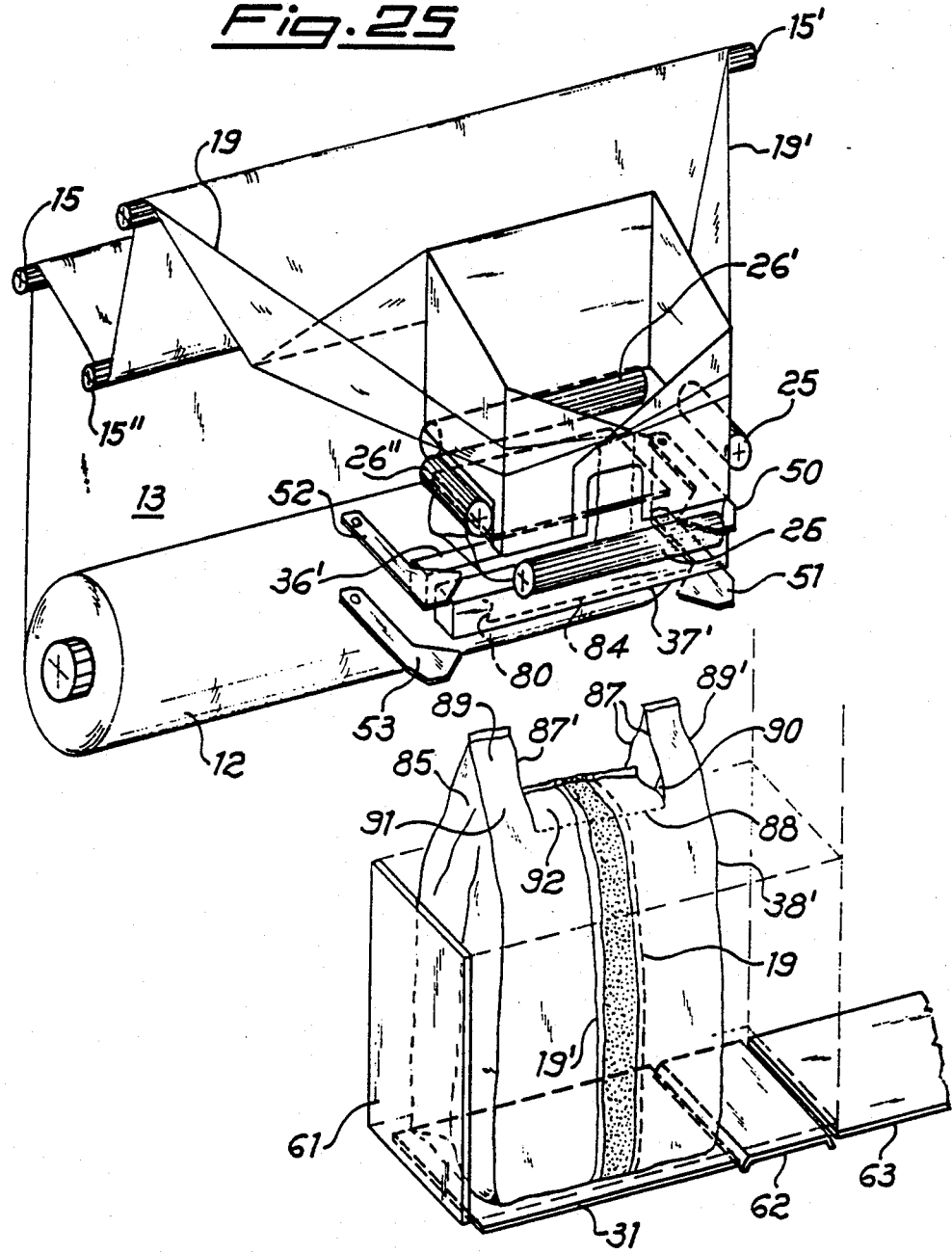

Another aspect of the present invention lies in the bags formed or formable by the apparatus, whereby the structure of the fully sealed and closed article-containing bags may integrally and unitarily incorporate handles to facilitate their transport. As shown in FIG. 25, the improved bag 38' of the invention is heat sealed closed along its top edge and includes longitudinal cuts 87, 87' transverse to the top closing seal and defining handles 89, 89' inwardly spaced from and adjoining the sides of the bag. Additionally, a line of perforations 88 is also preferably defined in each of the front and rear faces of the bag 38' between and bridging handles 89, 89'. These perforations 88, as will hereinafter become clear, facilitate subsequent opening of the sealed bag 38' for permitting access to and removal of its contents, and also reliably enable reuse of the bag after its original contents have been emptied therefrom. Indeed, even with a sealed bag without handles, the inclusion of perforations for facilitating the opening of the bags at home may desirably be included in the bag formation.

Figure 22:
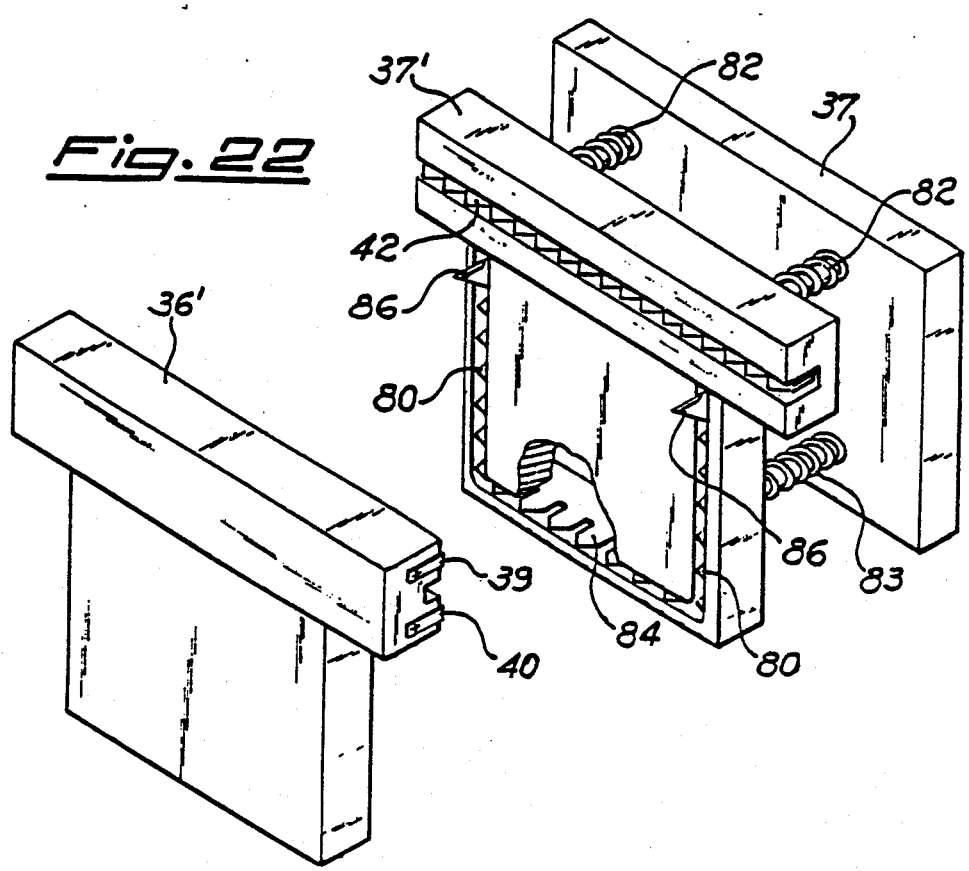
FIG. 22 is a perspective view partly in elevation, and partly in section, of still another embodiment of the invention comprising means for forming a bag with handles.
Figure 23:
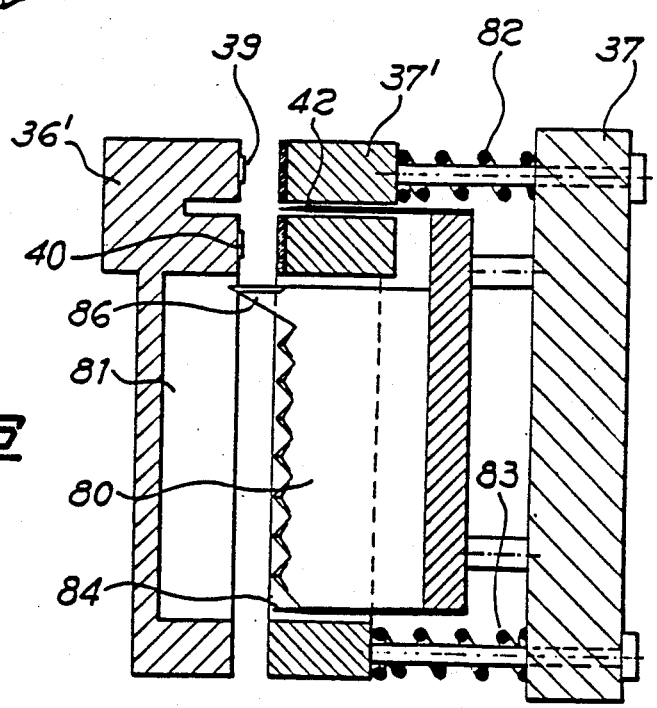
FIG. 23 is an enlarged sectional view of the handle forming means shown in FIG. 22.

The improved bag 38' is formable by the apparatus of the invention utilizing modified reciprocating elements 36', 37' which are illustrated in FIGS. 22 and 23. As there shown, reciprocating element 37' carries, in addition to the transverse blade 42 heretofore described, two longitudinally-oriented (e.g. vertical) elongated blades 80, preferable although not necessarily serrated or jagged, located so as to be disposed below the lower heat seal 40 of reciprocating element 36' when the elements 36', 37' are relatively moved into heat sealing engagement with the interposed tubular film wrapper 20. Element 36' correspondingly carries two blade receiving spaces or grooves 81, only one of which is visible in FIG. 23. Two pair of compression springs 82, 83 urge reciprocating element 37' against element 36' during the heat sealing and cutting of the film.

The two longitudinal blades 80 are joined together at their lower ends by a substantially horizontal perforating die or blade 84. The blades 80 are positioned so that, as reciprocating elements 36', 37' are moved together about the tubular film wrapper of bag 38', they contact the bag just interior or clear of the lateral extent of the gussets 85 formed by the free ends of folders 51, 53 on each side of the full bag 38'. Thus, as the compression springs 82, 83 press the reciprocating elements 36', 37' against the interposed tubular film wrapper 20, the blades 80 are driven through the front and rear faces of bag 38' and, consequently, through two layers of film 13 to thus sever said layers along the two lines defined by blades 80.

It is also within the contemplation of the invention that the blades 80 be positioned instead so that they contact the face of bag 38' within the lateral extent of the gussets 85. In this alternate case, approach and engagement of reciprocating elements 36', 37' about the interposed film wrapper 20 drives each of the blades 80 through one of the gusseted portions of bag 38' and, consequently, through four layers of film 13 to form a strip or bridge of film between the bag handles and the overlying protective envelope. This results, as will become evident, in a closed bag structure from which the chance of inadvertent spillage of the bag's contents is substantially minimized.

Each of the longitudinal blades 80 is also preferably provided with a projecting portion 86 which extends outwardly from element 37' by a distance sufficient so that, when reciprocating elements 36', 37' initially separate following heat sealing contact with the film, the projecting portions 86 continue to bridge the gap between the slightly separated elements 36', 37' as shown in FIG. 23. The purpose of projections 86 will become apparent hereinafter.

Figure 24:
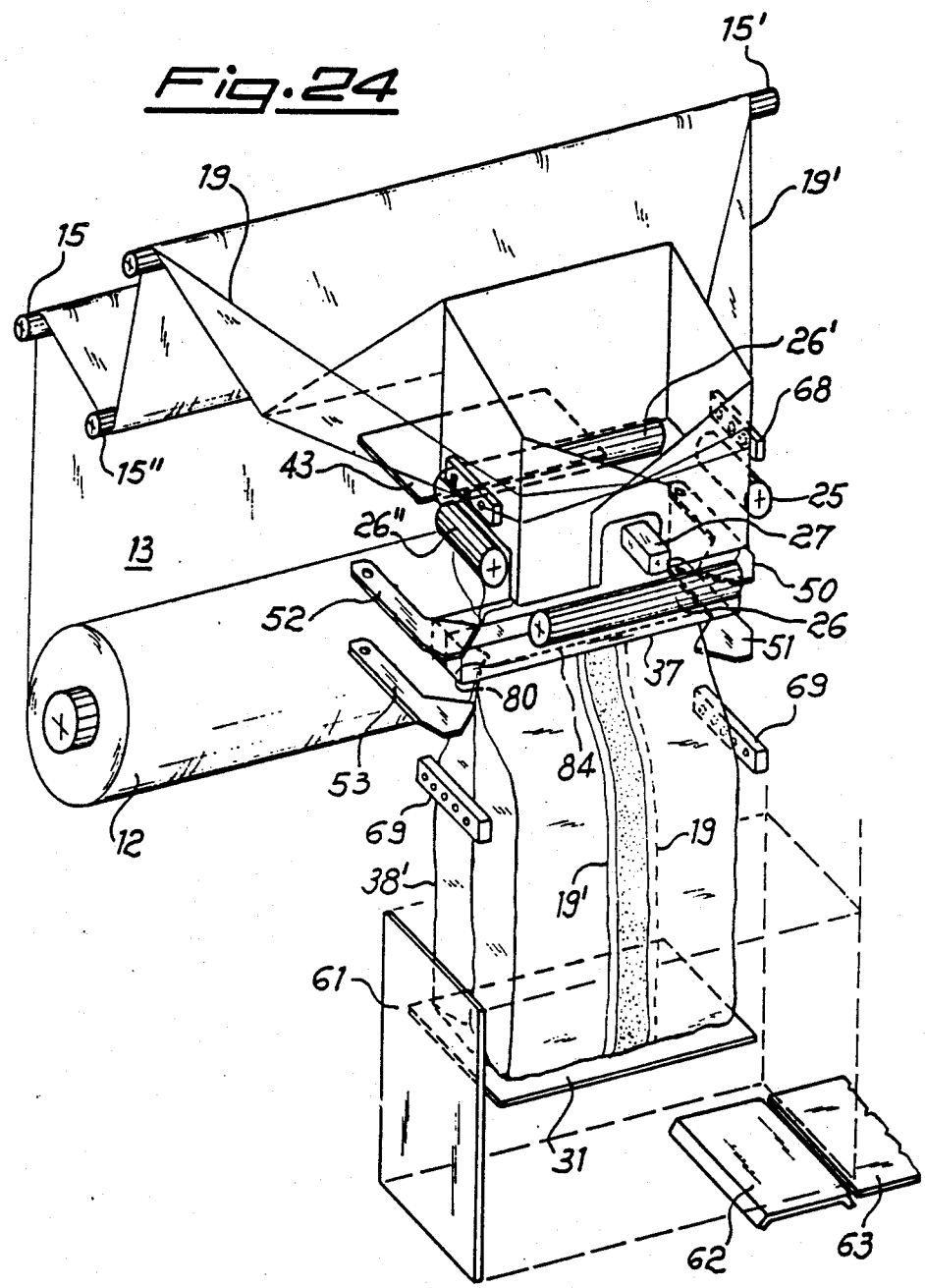
FIGS. 24 and 25 are perspective views in elevation of a portion of the apparatus of the invention at different times during the formation of bags with handles.

Formation of the improved handled bag 38' may best be understood by reference to FIGS. 24 and 25. As previously described in connection with other embodiments and aspects of the invention, as reciprocating elements 36', 37' are moved together toward and into engagement with the interposed tubular film wrapper 20, inward rotation of folders 50, 52 and 51, 53 create the pleats or gussets 85 in the new bag 30 and the filled bag 38', respectively. Upon contact of elements 36', 37' with the interposed film, the heat sealing plates 39, 40 on element 36' form the heat sealed bottom closure of the new bag 30 and top closure of filled bag 38, respectively, and blade 42 produces a transverse cut through the tubular wrapper between the two heat seals so as to separate the completed bag 38 from the bag 30 in formation which is still part of the continuous tubular film wrapper 20 thereabove. In addition, in the present modified form of the invention the elongated blades 80 create longitudinal (e.g. vertical) cuts 87, 87' inwardly spaced from the gusseted sides of the bag and perforating die 84 produces a line of punched slits or perforations 88 through the front and rear faces of the bag film.

Following heat sealing and blade cutting contact of reciprocating elements 36', 37' with the interposed bag film the supports separate slightly and platform 31 resumes its downward motion to carry the completed bag 38' to a position for subsequent ejection or discharge from the apparatus. As bag 38' moves downward with the descending platform 31, the projecting portions 86 of the blades 80 continue to cut the film of the full bag 38 longitudinally through the top heat seal closure of the bag. These additional cuts through the top closing seal of the bag, in conjunction with the longitudinal cuts 87, 87' produced by the blades 80, define and complete the handles 89, 89' along opposite sides of the filled and completed bag 38'.

It should be especially pointed out and understood that the top of the bag 38', between the longitudinal handle-defining cuts 87, 87', remains integral with the bag and, by reason of the top closing heat seal therebetween, forms an envelope 92 which is effective to prevent accidental loss or outpouring of the goods contained in the bag 38' during the subsequent transport thereof. This protective envelope 92 may nevertheless be readily removed to open the bag and permit access to the goods contained therewithin for emptying the bag at the convenience of the user. Removal of the protective envelope 92 is rendered advantageously more convenient and facile by inclusion of the perforation 88 produced by perforating die 84, which is preferred. When included, the protective envelope is separable along perforated line 88 from the remainder of bag 38'. Once the envelope 92 has been thus removed and the bag 38' emptied of its contents the bag may be readily reused for the receipt and/or transport of other articles.

Figure 26:
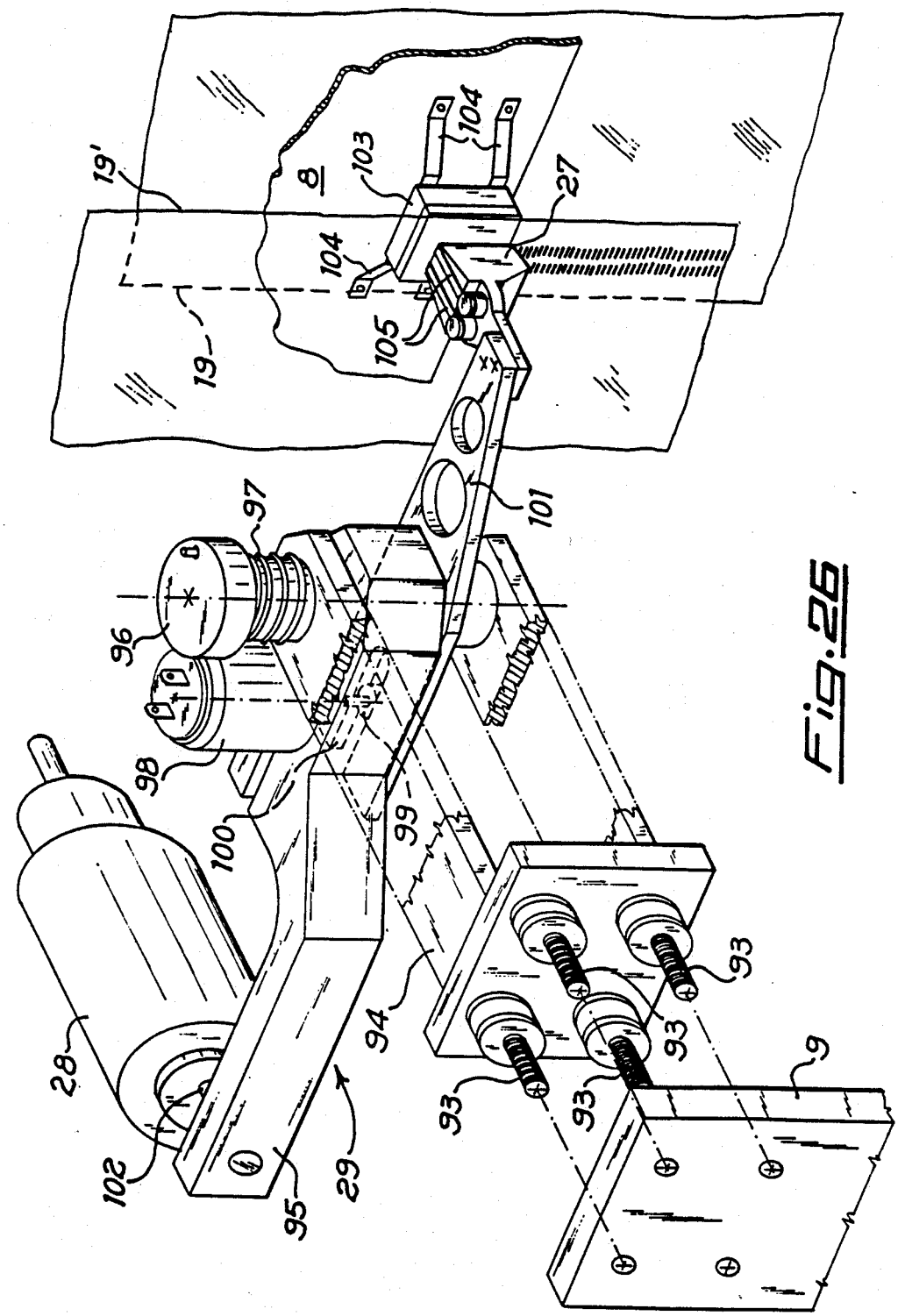
FIG. 26 is a perspective elevational view of a longitudinal heat sealing apparatus suitable for use as part of the invention.
Figure 27:
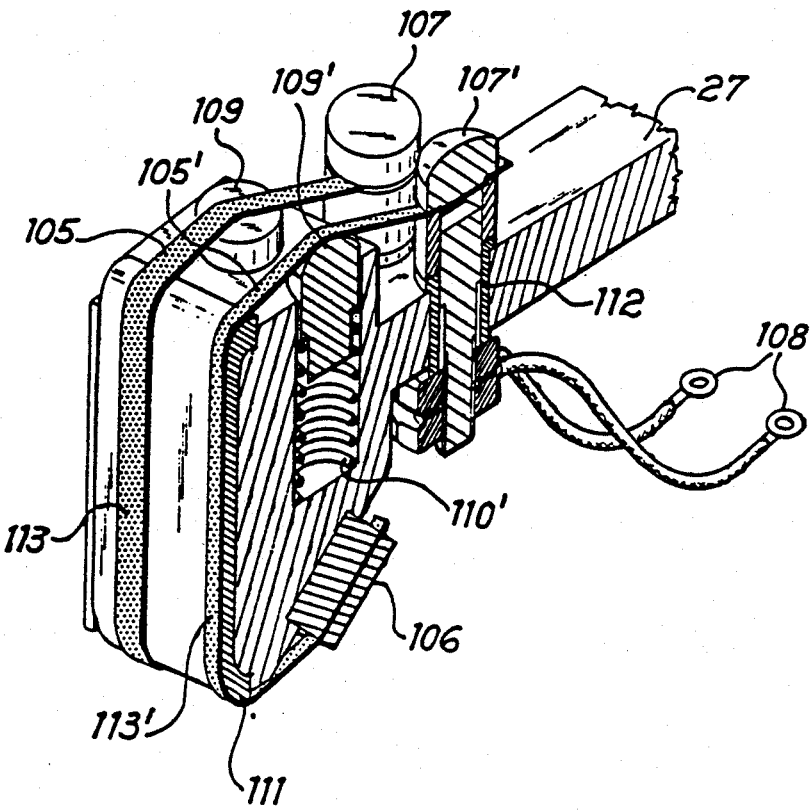
FIG. 27 is a perspective elevational sectional view of a sealing head used in the heat sealing apparatus shown in FIG. 26.

The details of the preferred form of welding device 29 (FIG. 3) for heat sealing the overlapped edges 19, 19' of the film 13 as the film is formed into a tubular wrapper 20 within the interior of former 17 is illustrated in FIGS. 26 and 27. The heat sealing unit 29 is supported by a bracket 94 which is joined by a plurality of threaded connectors 93 to a plate 9 which preferably comprises a portion of the frame of the bag forming apparatus. As shown and preferred, connectors 93 have vibration damping grommets or rubber rings or the like mounted thereon in order to minimize mechanical disturbance to the remainder of the apparatus. The heat sealing or welding head 27 is carried on one end of a rocker arm 101 which is mounted for pivotal movement about a vertical shaft 96 and in which a groove 100 is defined at its end opposite head 27. A lever 95 mounted at one of its ends for pivotal movement about shaft 96 is connected at its opposite end to the shaft 102 of electromagnet 28 which is preferably rigidly joined to the frame of the machine. A return torsion spring 97 disposed about shaft 96 between the shaft head and lever 95 urges the lever clockwise into contact with the end of the electromagnet shaft 102. The shaft of an electric motor 98 fixed to and mounted on lever 95 carries a cam 99 disposed in the groove 100 of rocker arm 101.

When the electromagnet 28 is actuated, lever 95 and, through its cammed connection, rocker arm 101 are driven through a partial counterclockwise rotation about shaft 96 against the urging of torsion spring 97. As rocker arm 101 so rotates, it carries welding head 27 toward the superposed edges 19, 19' of the film 13.

When on the other hand electromagnet 28 is not actuated, return spring 97 places a clockwise urgency on lever 95 and rocker arm 101 to carry and maintain welding head 27 out of contact with the superimposed edges of the film. This inactive or non-heat sealing position of the welding head permits facilitated manual feeding of film 13 into the interior of former 17 to be readily carried out when, for example, it is necessary to replace an exhausted film roll 12 supported on rollers 14, 14'.

When electromagnet 28 is actuated the heat sealing unit 29 is moved into working position in which welding head 27 approaches the superposed film edges 19, 19'. The edges 19, 19' are in contact with a plate 103 resiliently mounted on and supported from the surface of collar 8 by leaf springs 104. As the tube-formed film 13 is drawn downwardly within former 17, its superposed edges 19, 19' are pressed between welding head 27 and plate 103 by a reciprocated or hammering movement of the welding head against the film edges. This hammering action of head 27 on plate 103 is effected by the operation of motor 98 which, through rotation of motor-driven cam 99 in groove 100, causes high frequency oscillation (as for example at 50 to 80 Hertz) of rocker arm 101 about shaft 96. In an alternative arrangement, the combination of motor 98, cam 99 and rocker arm groove 100 may be replaced with a repeatedly and alternately activated and deactivated electromagnet suitably acting on rocker arm 101.

With particular reference to FIG. 27, welding head 27 includes a pair of electrical strap resistors 105, 105' in series connection through a U-connector 106 and in electrical communication with a power source (not shown) at terminal 107, 107' through a cable 108. Insulated pushers or tensioners 109, 109' which are mounted on and urged upwardly by compression springs 110, 110' compensate for terminal expansion and assure that proper tensioning of the strap resistors is continuously achieved. The strap resistors overlay spacers 111, 112 which insulate the resistors from the metal casing of the welding head 27.

Heat is supplied to the overlayed edge portions of film 13 to be joined by conduction through the flattened front surfaces 113, 113' of strap resistors 105, 105'. As is well known, proper performance of the heat sealing operation requires close or narrow control of the heat sealing temperatures of resistors 105, 105'; such control can be effected in any known manner as, for example, with an electronic control system which monitors the temperature value of the resistors by monitoring their resistance at terminals 107, 107'. The monitored resistance is compared with a predetermined reference resistance value corresponding to the desired sealing temperature and the electronic control system operates to maintain the difference between the measured resistance and the reference value within an acceptable range by controlling the electric power supplied to the strap resistors.

From the foregoing it should be apparent that the preferred method of joining the superposed edges 19, 19' of tubular film wrapper 20 to form a continuous longitudinal seal along the film tube is effected by the combination of two simultaneous actions having thermal and mechanical characteristics. The first action is the localized softening of the film which is caused by heat supplied through strap resistors 105, 105'; the second action is the high frequency hammering of the softened area of the film as the welding head 27 is repeatedly driven against plate 103 with the superposed film edges 19, 19' interposed therebetween. The intermittency of the hammering action also allows and enables a smooth longitudinal flow of the continuous tube-formed film under and past the welding head 27.

Another embodiment of a check-out counter, designated by the general reference numeral 120, in accordance with the invention is illustrated in FIGS. 28 to 33. Check-out counter 120 is constructed and intended for fully self-service operation by the customer-purchaser of articles 5, 5' and, as such, obviates the usual and expensive requirement that a merchant hire a separate cashier to staff each and every check-out lane in the store. Counter 120 of the invention is additionally constructed to promote unusually efficient movement of customers through the check-out transaction and, therefore, out of the store increasing the rate and volume of customers to which the store may cater.

Figure 28:
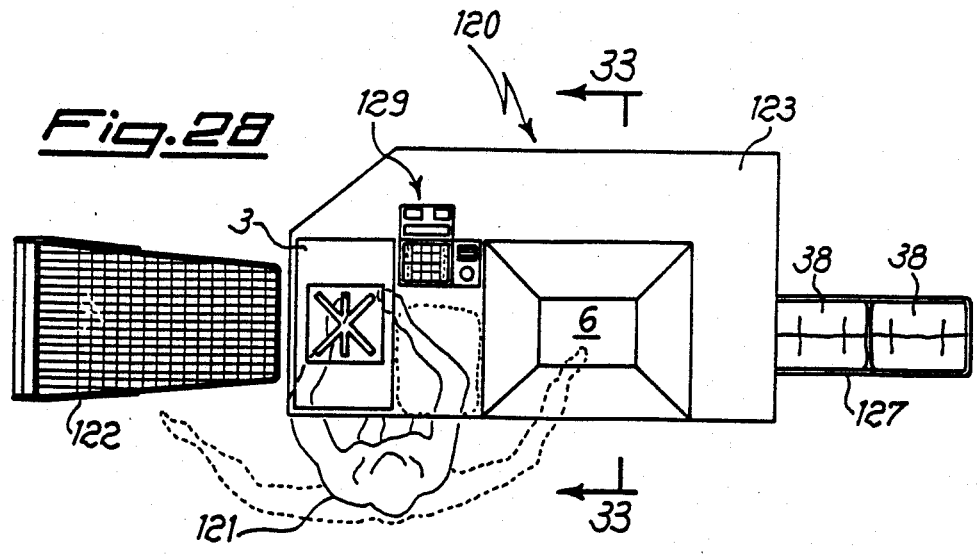
FIG. 28 is a plan view of a fully self-service check-out counter in accordance with still another form of the invention.

With particular reference to FIG. 28, check-out counter 120 includes a laser scanning code reader device 3 for reading universal product identification code information from articles 5, 5' selected by a customer 121 and typically transported to the check-out counter by a shopping cart or basket 122 or the like. As will hereinafter be described, articles that have been moved across and scanned by reader 3 are placed into bags through an opening 6 which is defined in the top surface 123 of the counter. A shutter 124 is disposed within the counter immediately below its top surface 123 for movement between a first position fully covering and closing opening 6 and a second position remote from the opening.

Disposed within the interior and, preferably, forming an integral part of check-out counter 120 is a bag forming apparatus 125. Except as otherwise noted or required by the following description, it is contemplated and generally intended that apparatus 125 be substantially identical in structure and operation to the bag forming apparatus depicted in the drawings and herein described with respect to the check-out counter embodiments of FIGS. 1 and 2. As such, repetition of the major details of the bag forming apparatus 125 is omitted. In any event, apparatus 125 is disposed primarily within the interior of counter 120 so that former 17, and internal collar 8, are located immediately below and in register with counter opening 6 whereby articles 5, 5' inserted through opening 6 are received within a bag 30 being custom-formed by apparatus 125. The partially fragmented view of FIG. 30, for example, depicts a bag 30 being formed within counter 120, the bag being supported on loading platform 31 and weight sensor 118. The inclusion of weight sensor 118, or of a functionally equivalent arrangement for detecting the weight and changes in the weight of a bag 30 supported on loading platform 31, is considered central to this embodiment of the invention. Moreover, and although not specifically illustrated in such detail, those skilled in the art will appreciate that in this particular form of the check-out counter of the invention former 17 and collar 8 of the bag forming apparatus do not extend through opening 6 in the manner illustrated in FIG. 3 but, rather, terminate sufficiently below opening 6 in top surface 123 so as to avoid interfering contact with movable shutter 124.

Filled bags 38 completed by bag forming apparatus 125 are discharged from the interior of counter 120 through a discharge opening 126 defined in the end wall of the counter most remote from scanner 3 (FIG. 29). Bags 38 may, for example, be discharged as completed onto a roll conveyer 127 along which the filled and, as preferred, sealed bags can remain until subsequent removal by the customer 121. Roll conveyor 127 may comprise an extension of or from fixed bag support surface 62 (FIG. 5) along which completed bags 38 are advanced by pusher 61 from loading platform 31 to roll conveyor 127, or may in the alternative extend all the way from and adjacent to the fully lowered position of loading platform 31 in which case fixed surface 62 is omitted; in either case, as should be apparent, vertically-movable ejection platform 63 is unnecessary in this embodiment. The provision of sidewalls or rails 128 of appropriate height along conveyor 127 will help to maintain the bags 38 in an upright orientation during and following their discharge from the counter interior.

Check-out counter 120 further includes an information entry and display panel 129, best seen in the enlarged detail of FIG. 31. Panel 129 has a keyboard 130 to enable manual entry of product identifying and/or pricing information when, for example, scanner 3 is unable to read the product code or the article does not bear such a code. Panel 129 also includes illuminatable indicators 131, 132 labelled "OK" and "WAIT", or colored green and red, respectively, and pushbutton switches 133, 134 and 135 labelled "START", "FINISHED" and "BAG", respectively. Of course, all of the above-mentioned designations and/or colorations in respect of panel 129 are soley by way of example to facilitate an understanding of the structure and operation of the inventive check-out counter 120.

With continued reference to FIG. 31, panel 129 further includes a paper tape printer (not shown) for preparing a printed tape record 136 of the various articles purchased by the customer. A "HELP" pushbutton switch 137 is depressable when the customer requires special assistance or instructions in the use and operation of the check-out counter apparatus. Such assistance may be provided by actuation of recorded messages conveyed to the customer through a loudspeaker 138 or by signaling a supervising employee of the store who may then respond through the loudspeaker. Messages, customer prompts and additional assistance may also be provided on a character display 139 which can alternatively take the form of a cathode ray tube or other known character and/or graphics display device.

The apparatus for reciprocating shutter 124 between its first position closing the counter opening 6 and its second position remote from the opening for permitting the insertion of articles 5, 5' into a bag 30 being formed by apparatus 120 may be constructed in any suitable manner. One illustrative form of shutter reciprocating device is shown, by way of example, in FIGS. 32 and 33 and will now be described.

Referring initially to FIG. 32 in which the shutter is seen in both its first (broken line) and second (solid line) positions, shutter 124 comprises a substantially rectangular plate formed of any convenient material, such as plastic or metal having elongated tabs 140, 140' extending outwardly from its opposite edges. Tabs 40, 140' are connected to axial bearings 141, 141' which are slidable along respective guide rods 142, 142'. Guide rods 142, 142' may be supported, for example, on vertical plates 9, 10 (FIG. 3) or the like which form a part of the frame of the bag forming apparatus. An extension 143 on tab 140 is secured by bolts 144 to a toothed belt 145 trained about a drive pulley 146 and an idler pulley 147. Idler pulley 147 is supported for freewheeling rotation about a shaft mounted to a fixed support member 148.

A motor 149 is bidirectionally operable for moving pulley 146 and thereby effecting reciprocated movement of shutter 124. More particularly, the shaft of motor 149 carries loosely journaled drive pulley 146 and a single plate clutch 150 which is keyed to the motor shaft and is urged into engagement with drive pulley 146 by a spring 151. Rotation of the motor shaft is thereby transmitted through clutch 150 to drive pulley 146 and toothed belt 145 which, in turn, carries shutter 124 between its first and second positions by its bolt-secured connection to the belt at tab extension 143. The clutch force is selectively variable by adjustment of a nut 178 to vary the urgency with which clutch 151 is driven against drive pulley 146 by spring 151; this ability to vary the clutch force enables selective adjustment of the force with which shutter 124 is reciprocated so as to avoid injury to a customer whose hand or other body part may extend into or through opening 6 as shutter 124 is returned from its second to its first position closing counter opening 6.

Figure 34:
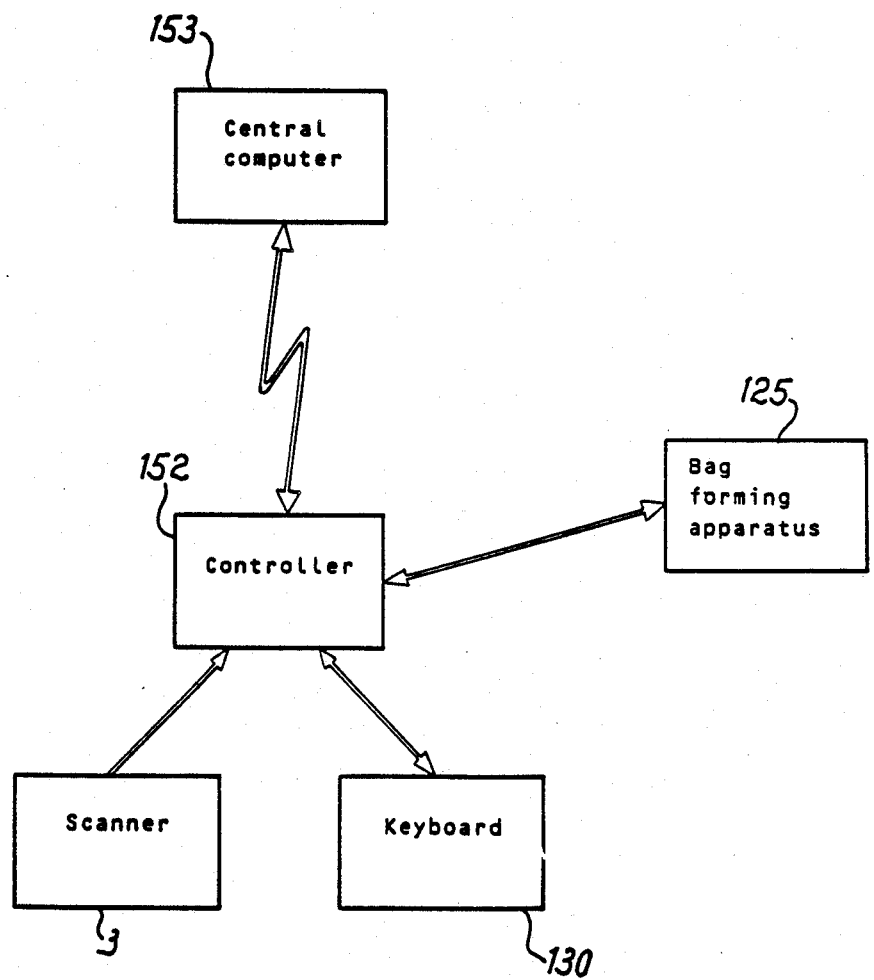
FIG. 34 is a block diagram showing the connection of the bag forming apparatus and associated elements of the self-service check-out counter to a controller and to the store's central computer.

FIG. 34 diagramatically illustrates the electrical and electronic connection of the bag forming apparatus 125 to a processor or controller 152, which may for example be implemented by a microprocessor-based computer, and to the central computer 153 or other main information processing and/or data storage apparatus of the supermarket or store in which the check-out counter 120 is located. The central computer will typically contain in its memory or storage devices data relating to the entire store inventory by, for example, product identification, weight and price. The exact constructing of controller 152 is considered to be within the ability of those skilled in the art utilizing conventional components and devices and its details are accordingly omitted from this disclosure. Laser scanner 3 and manual data entry keyboard 130 are also connected to controller 152.

Figure 35:
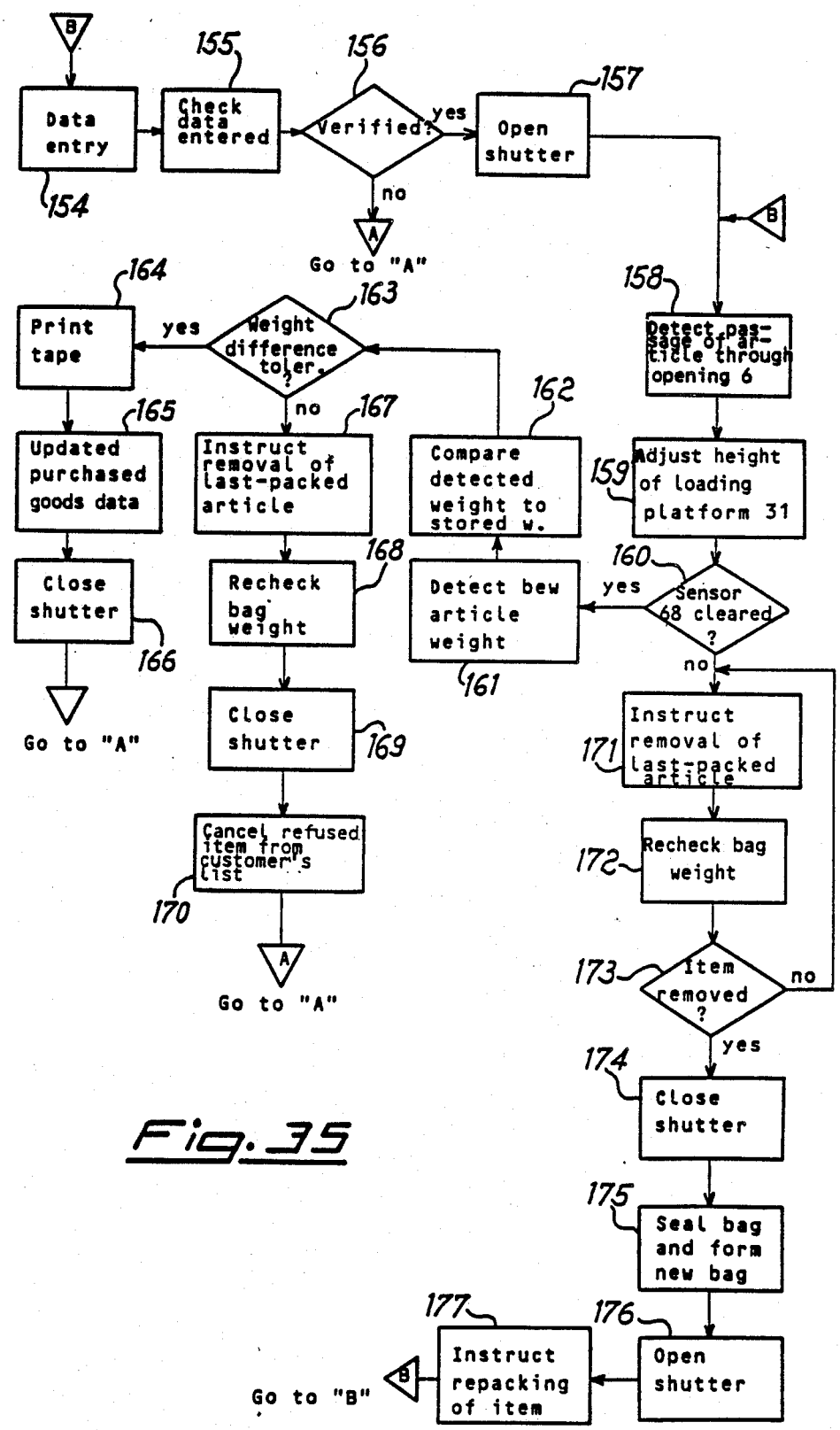
FIG. 35 is a diagrammatic flow chart detailing the steps in the operation of the self-service check-out counter of FIG. 28 and the method of this embodiment of the invention.

The operation add use of the check-out counter 120 may now be understood with specific reference to the flow chart of FIG. 35. It should at the outset be understood that the check-out counter 120 is designed and constructed for entirely self-service operation by the customer and thus does not require the presence of a cashier or other store employee to either oversee or assist in its use. Thus, the customer 121 who has completed selection of articles 5, 5' to be purchased proceeds to check-out counter 120, typically with the articles temporarily stored or disposed in a cart or basket 122 or the like (FIG. 28). In step 154 in the flow chart, article identification and/or pricing information is entered into the check-out system. More particularly with respect to the disclosed apparatus, the customer first initiates the operation of scanner 3 by depressing pushbutton switch 133, following which the customer begins to select and grasp articles 5, 5' from cart 122 and to manually transport them, one by one, across the face of the scanner to automatically input the universal product identification codes which they bear. Pricing and/or item identification data of any article unable to be automatically scanned in this manner can be entered manually by way of keyboard 130. Either immediately after depression of pushbutton 133 to start scanner 3, which is generally preferred, or after scanning of the first article, the customer depresses pushbutton 135, activating the bag forming apparatus 125 which begins the manufacture of a bag 30 as heretofore described. Operation of pushbuttons 133 and 135 is required only once—i.e. when a new customer has proceeded to counter 120 and is ready to begin the check-out procedure.

The data either read by scanner 3 or manually entered through keyboard 130 is verified in steps 155 and 156. Verification consists of confirming a successful scanning or manual data entry operation, and comparing the entered data with that residing in the central computer 153 to confirm that the article is in fact one that is sold by the store. If a problem is detected, the data must be reentered and the customer is instructed, for example through illumination of indicator 132 and/or by way of a message appearing on display 139 or emitted from loudspeaker 138 to rescan or manually reenter the data. Assuming, on the other hand, that the data verification test of step 156 is successful, indicator 131 may be illuminated to so inform the customer and motor 149 is operated to move shutter 124 from its first to its second position remote from counter opening 6 (step 157). The customer may then place the article that has been scanned and verified through opening 6 and into the bag 30 being custom-formed within the interior of check-out counter 120 by apparatus 125.

It should be pointed out at this juncture that there has been only minimal handling of the article 5 as it has moved from shopping cart 122 to bag 30. The article has been picked up from cart 122, carried across the face of scanner 3 and placed into the bag 30 by the same person (the customer 121), in a single motion and without any need to release, regrasp or reorient the article from start to finish. The result is a substantial time savings, particularly when multiplied over the generally substantial number of items purchased by each customer and the numerous customers passing through each check-out station, for the customer and vastly increased efficiency (and correspondingly decreased costs) for the merchant.

As the successfully scanned article 5 is placed through opening 6 into bag 30, its passage is detected in step 158 by the optical or electronic curtain defined by upper sensor arrays 68. In step 159, the height of loading platform 31, on which bag 30 is supported, is adjusted if necessary to clear sensors 68. That is, if sensors 68 remain at least partly obscured after the most recent article has been placed into bag 30, platform 31 is caused to descend until the optical curtain of sensors 68 is once again unobstructed. It is generally contemplated that, in this particular embodiment of the invention, platform 31 is adapted to descend by small, incremental amounts as articles are placed into the bag 30. Nevertheless, the descent of platform 31 as articles are inserted into bag 30 may alternatively be arranged to take place in a limited number of larger increments, as previously disclosed in connection with the check-out counter embodiment of FIG. 1, as a matter of design choice. In any event, in step 160 the condition of sensors 68 is tested to determine whether the sensors have been cleared by a further descent (if required) of the loading platform.

Assuming for the moment that the optical curtain of sensors 68 is or has become (through descent of platform 31) unobstructed, the positive outcome of the test of step 160 leads to step 161 in which the weight of the article just added to bag 30 is determined. This determination is made by calculating the difference in the weights of bag 30 before and after the addition of the last-packed article, those weights being sensed by or in conjunction with weight sensor 118. The weight of the article packed in bag 30, as so calculated, is then compared (step 162) with the known or actual weight of the article which is, for example stored in the central computer 153 of the supermarket or store. A determination that the product scanned by the customer and identified in the store records is the same one that was placed into ba 30 requires that the results of the comparison of step 162 yield a weight difference of no more than an acceptable tolerance of predetermined magnitude which is related, primarily but not exclusively, to the accuracy of sensor 118. Whether that weight difference falls within the allowable tolerance or range is determined in step 163.

If the difference between the measured and stored (actual) weights of the article is within the allowed tolerance, information such as an identification ad the price of the article are printed on paper tape 136 (step 164) and the supermarket records are updated (step 165) to record, for example, the purchase of that item. Shutter 124 is then returned from its second to its first position closing counter opening 6 (step 16) by operation of motor 149, and the apparatus is thus ready to begin a new check-out cycle commencing with step 154 in FIG. 35.

Returning now to the test of flow chart step 163, if the difference between the measured and stored weights of the last-packed article 5 is not within acceptable tolerance the customer 121 is instructed in step 167, as by illumination of indicator 132 and/or an appropriate message on display 139 or through loudspeaker 138, to remove from bag 30 the last item placed therein. It should be recognized that the failure of the weight difference tolerance test of step 163 can result from a variety of circumstances. The most obvious, of course, is intentional efforts by the customer to defraud by scanning one item but then packing another, more expensive one, in bag 30. It is also possible, however, that the customer has innocently and inadvertently interchanged two articles which were scanned in rapid succession and, since proper operation of check-out counter 120 requires that the article packed at any given moment be the same one most recently scanned, this will result in rejection of the last-packed article. In addition, the article selected for purchase by the customer could be damaged, defective or irregular and therefore should not be sold by the store. In any event, in step 168 the weight of bag 30 is then rechecked, using weight sensor 118, to verify that the last-packed article has been removed and, when it has been removed from the bag, shutter 124 is returned from its second to its first position closing the counter opening 6 (step 169).

All identifications of the removed item are removed from the listing of articles purchased by the customer in step 170, and the apparatus is once again ready to scan the next article and begin another article check-out cycle (step 154).

The third and final alternative situation concerning the operation of check-out counter 120 of the invention begins when the results of the test of step 160 indicate that the optical curtain defined by upper sensor arrays 68 remains obstructed after the last-packed article has been added to bag 30 and loading platform 31 has reached its maximally lowered position. This is an indication that custom-formed bag 30 has been expanded to its maximum allowable height and, therefore, that the last-packed article cannot be accommodated in the bag. Consequently, in step 171 the customer is instructed, by illumination of indicator 132 and/or a message on display 139 or through loudspeaker 138, to remove the last-packed article from the bag. The weight of bag 30 is then rechecked (step 172) to verify that the last-packed article has been removed and, when it has been determined that the item is no longer in the bag (step 173), the shutter is moved from its second to its first position to cover and close the counter opening 6 (step 174). With the opening 6 closed so as to prevent any part of the customer's body from interfering with or being injured by the operation of bag forming apparatus 125, filled bag 30 is sealed closed or otherwise complete as previously described, formation of a new bag 30 is begun, the completed bag 38 is detached from the tubular web f film material and bag 38 is discharged from the interior of counter 120 along roll conveyor 127 (step 175).

With the bottom seal of a new bag 30 formed, the bag is ready to receive articles for packing therein and, consequently, shutter 124 is again moved from its first to its second position by operation of motor 149 to open counter opening 6 (step 176). The customer is then instructed in step 177, by illumination of indicator 131, by a visible message on display 139 and/or by an oral message emitted through loudspeaker 138, to repack the article 5 that had to be removed from the previous, now completed bag 38. As that article is inserted into the new bag 30 its entry is detected as the optical curtain of sensor arrays 68 is broken (step 158) and the operating cycle of the apparatus continues from that point as previously described.

When all of the articles 5, 5' being purchased by customer 121 have been scanned (or information relating to those items has been manually entered through keyboard 130) and have been packed in bags custom-formed by apparatus 125, the customer depresses push-button switch 134 to indicate that no additional articles remain to be checked out. Actuation of switch 134 causes the operation of scanner 3 to be stopped, the current bag 30 to be sealed closed or completed and discharged on roll conveyor 127 from the interior of counter 120, the cost of all of the articles purchased to be totalled and the printing of the paper tape record 136 of the customer's purchases to be completed. The customer then proceeds to a central cashier (not shown) with the paper tape and, preferable, with the bags 38 containing the articles purchased and pays the total amount due to such cashier. After paying for the goods, the customer leaves the store with the bags 38 of packed articles 5, 5'.

The self-service check-out counter 120 of the invention thus advantageously enables the realization of significant reductions in the amount of time spent by each customer in proceeding through the check-out process and in the costs to the merchant for otherwise staffing each and every check-out counter in the store with a cashier. A not insubstantial factor in reducing the time required for each customer to complete the check-out process is the pairing of customer scanning of the articles being purchased with the on-site and custom-sized manufacture of bags at the check-out counter. Nevertheless, those skilled in the art will readily appreciate that significant self-service check-out efficiency can still be realized where the bags 30 formed on-site at the counter 120 are not custom-sized to conform to the volume of articles purchased but, rather, are all formed to several predetermined sizes or even to only a single size. Such a modification is accordingly within the scope and contemplation of the invention.

Indeed, the on-site manufacture of bags at any check-out counter, either self-service or cashier attended, will result in substantial savings in the time required to process each customer therethrough. Thus, a further modification intended to be within the contemplation of the invention is modification of the self-service check-out counter disclosed in U.S. Pat. No. 4,676,343 to Humble et al to incorporate an on-site bag forming apparatus such, for example, as those described and taught herein, and the entire disclosure of the Humble et al patent is expressly incorporated by reference herein. The manner of combining any of the several check-out counter embodiments of the Humble et al patent with on-site bag forming apparatus in accordance with the present invention will be apparent to those skilled in the art and having knowledge of the teachings of this disclosure.

Thus, the various embodiments of process, apparatus and articles herein above described in accordance with the invention provide for the combination of a fully self-service check-out counter and the automated packaging of widely varied volumes of goods in custom-sized bags, manufactured on-site and on-demand in accordance with the particular volume of goods to be packed. Each bag may have a height continuously or step-wise variable between a minimum and a maximum—as for example between about 10 to 15 cm and about 50 cm—depending upon the particular installation and selectable design criteria at the option of the user.

While there have been shown and described numerous novel features of the invention as applied to various preferred and/or illustrative embodiments thereof, it will be understood that various omissions and substitutions and changes in the form and details of the devices illustrated and in their operation, and in the methods and processes described, may be made by those skilled in the art without departing from the spirit of the invention. Indeed, since there are so many novel features, many may be omitted if desired without departing from the invention, and the described structures are generally preferred but not required, modifications being possible without departing from the invention. It is the intention, therefore, that the invention be limited only as indicate by the scope of the claims appended hereto.

What is claimed is:

1. Apparatus for permitting a customer to check out one or more purchased articles self-service, comprising:
   means for identifying each of said articles and for determining a characteristic of said identified article;

means for forming bags on demand for containing said articles in a bag formed by said apparatus;

means for determining said characteristic of the actual article after said article has been identified by said article identifying means and before said bag for said article has been completed and removed from said bag forming means; and means for comparing said characteristic of said article as identified by said article identifying means with the characteristic of the actual article to confirm the identity of the article bagged by a bag formed by said bag forming apparatus, whereby to prevent both deliberate fraud and inadvertent mistake in the self-service checkout of said one or more articles.

2. Apparatus in accordance with claim 1, wherein said article identifying means comprises code reader means for automated detection of codes borne by articles being purchased by the customer as the articles are moved across a portion of said reader means.

3. Apparatus in accordance with claim 2, wherein said code reader means comprises a laser scanner.

4. Apparatus in accordance with claim 2, wherein said article identifying means further comprises a keyboard for manual entry of article identifying information.

5. Apparatus in accordance with claim 1, wherein said bags formed by said bag forcing means are formed of a flaccid material.

6. Apparatus in accordance with claim 1, wherein said comparing means compares said characteristic of each identified article with said characteristic of the actual article next received by said bag forming means.

7. Apparatus in accordance with claim 6, wherein said characteristic is article weight.

8. Apparatus in accordance with claim 6, wherein said characteristic is article weight and said comparing means compares said characteristic of each identified article with said characteristic of the actual article after the article has been placed into a bag being formed by said bag forming means.

9. Apparatus in accordance with claim 1, wherein said bag forming means includes an article-receiving portion through which articles to be packed in a bag formed by said bag forming means are inserted, said article identifying means and said article-receiving portion of the bag forming means being so positionally juxtaposed that following information input by the customer through said article identifying means the article is placeable by the customer directly into said article-receiving portion of the bag forming means in a single, substantially continuous motion.

10. Apparatus in accordance with claim 1, further comprising shutter means for preventing placement of an article into said bag forming means until the customer has input information relating to the article through said article identifying means.

11. Apparatus in accordance with claim 10, wherein said shutter means comprises a member movable between a first position preventing access of articles to said bag forming means and a second position permitting such access.

12. Apparatus in accordance with claim 11, further comprising a check-out counter, said bag forming means being disposed within the interior of said check-out counter and said checkout counter including an opening defined through the counter substantially adjacent to a portion of the bag forming means into which articles to be packed in bags are placed, said shutter means being disposed so as to close said counter opening in said first position and to leave said opening substantially unobstructed in said second position of the shutter means.

13. Apparatus in accordance with claim 1, wherein said bag forming means forms bags which are custom-sized to conform to the volume of articles packed in the bags.

14. Apparatus in accordance with claim 1, wherein said bag forming means forms bags from longitudinally continuous, flaccid sheet material having spaced apart longitudinal edges.

15. Apparatus in accordance with claim 14, wherein said bag forming means includes a longitudinally extending hollow former means for advancing said sheet material through said bag forming means into said former means in a downward direction, said former means shaping said sheet into a peripherally continuous configuration with said longitudinal sheet edges in sealable relation, and said apparatus further comprising a check-out counter and passage means for permitting articles to pass from the check-out counter into a bag in formation by said bag forming means, said peripherally continuous configured sheet being in register with said passage means for receiving articles from the check-out counter.

16. Apparatus in accordance with claim 15, wherein said bag forming means further comprises means for sealingly connecting said longitudinal edges of said sheet to form a peripherally continuous wrapper.

17. Apparatus in accordance with claim 16, wherein said bag forming means further comprises sealing means below said former means for sealingly closing the bottom of said wrapper to form the bottom of a bag.

18. Apparatus in accordance with claim 17, wherein said bag forming means further comprises support means for the bottom of said bag, and means for moving said support means downwardly to move the top of said bag into operative relation with said sealing means for bag-closing sealing thereby.

19. Apparatus in accordance with claim 1, wherein said bag forming means is operable for on-demand and on-site manufacturing of custom-sized article-packed bags substantially conforming in size to the volume of articles packed therein, said bag forming means comprising:

means for longitudinally feeding a longitudinally extending tubular wrapper formed of flaccid film material;

first means for transversely sealing the film at a first location along the tubular wrapper to create a closed bottom of a bag being formed for the receipt of articles to be packed therein, the top of said bag in formation remaining open for the receipt of said articles;

means for transversely cutting the film at a second location along the tubular wrapper above said transverse seal to define the ultimate top of the bag after the bag has received a volume of articles and to separate the articles containing bag from the longitudinally continuous tubular wrapper; and means for selecting said second location including means of determining the volume of articles received in the bag being formed and for longitudinally advancing the tubular wrapper by an amount sufficient to place said second location along the tubular wrapper at a line defining a length of wrapper sufficient to accommodate said volume of articles.

20. Apparatus in accordance with claim 19, said bag forming means further comprising second means for transversely sealing the film adjacent the vicinity of said second location to close the top of the bag for preventing the unintended loss of packed articles from within the bag.

21. Apparatus in accordance with claim 20, said bag forming means further comprising means for forming a pair of spaced apart handles unitarily with the tubular wrapper at the top of said bag and for defining a protective envelope intermediate said handles to facilitate retention of articles packed in the bag.

22. Apparatus in accordance with claim 21, said bag forming means further comprising means for perforating the tubular wrapper in the area of said protective envelope for facilitating the opening of said envelope to gain access to the articles packed in said bag.

23. Apparatus in accordance with claim 19, said bag forming means further comprising mean for forming a pair of spaced apart handles unitarily with the tubular wrapper at the top of said bag.

24. Apparatus in accordance with claim 19, said volume determining and tubular wrapper advancing means further comprising sensor means for detecting the uppermost level of received articles most remote from the bottom of the bag being formed and mean for advancing the tubular wrapper to define the top of the bag at a predetermined distance along said tubular wrapper beyond the determined uppermost level of goods.

25. Apparatus in accordance with claim 19, said bag forming means further comprising means for supplying substantially flat film material having longitudinal edges, and means for forming the continuous flat film material into said tubular wrapper.

26. Apparatus in accordance with claim 25, said tubular wrapper forming means comprising a substantially hollow former, and means for directing said flat film material into the interior of said hollow former to shape said flat material as a tubular wrapper with said longitudinal edges in sealable relation, and means for sealingly joining said longitudinal edges to form said tubular wrapper.

27. Apparatus in accordance with claim 26, wherein said longitudinal edges are in sealable relation by virtue of marginal longitudinal edge portions of said flat film being in overlapping relation, and wherein said means for sealingly joining said edges joins said edges by joining said marginal edge portions in said overlapping relation.

28. Apparatus in accordance with claim 27, said tubular wrapper advancing means comprising a platform for supporting the bottom of the bag being formed during the packing of articles therein and means for substantially vertically moving said platform to selectively advance the bag being formed on the tubular wrapper.

29. Apparatus in accordance with claim 19, further comprising a check-out counter within which bags are formed by said bag forming apparatus and means for discharging a completed bag from the check-out counter for removal therefrom.

30. Apparatus in accordance with claim 19, further comprising means for sensing the weight of articles contained in the bag being formed.

31. Apparatus in accordance with claim 27, further comprising a check-out counter and an opening defined in said counter and aligned with said substantially hollow former and through which articles to be packed are inserted into the interior of the former for receipt within the bag being formed.

32. Apparatus in accordance with claim 17, said bag forming means further comprising support means for the bottom of said bag being formed, and means associated with said support means for sensing the weight and changes in the weight of said bag as the bag receives articles being packed therein.

* * * * *